US008094807B2

(12) United States Patent
Ishibashi et al.

(10) Patent No.: US 8,094,807 B2
(45) Date of Patent: Jan. 10, 2012

(54) INFORMATION PROCESSING SYSTEM, INFORMATION PROCESSING APPARATUS, METHODS, PROGRAM AND RECORDING MEDIUM

(75) Inventors: Yoshihito Ishibashi, Tokyo (JP); Susumu Kusakabe, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 1154 days.

(21) Appl. No.: 11/385,827

(22) Filed: Mar. 22, 2006

(65) Prior Publication Data

US 2006/0239421 A1 Oct. 26, 2006

(30) Foreign Application Priority Data

Mar. 25, 2005 (JP) ................................ P2005-087737

(51) Int. Cl.
*G05B 19/00* (2006.01)

(52) U.S. Cl. .................................... 379/399.01; 340/5.1

(58) Field of Classification Search ................... 340/5.1; 379/399.01
See application file for complete search history.

(56) References Cited

U.S. PATENT DOCUMENTS 5,023,597 A 6/1991 Salisbury
5,164,707 A 11/1992 Rasmussen et al.
5,739,746 A 4/1998 Shaffer et al.
5,914,701 A 6/1999 Gersheneld et al.
5,987,438 A 11/1999 Nakano et al.
6,058,477 A 5/2000 Kusakabe et al.
6,195,008 B1 2/2001 Bader
6,223,018 B1 4/2001 Fukumoto et al.
6,611,195 B1 8/2003 Manneschi et al.
6,897,788 B2 5/2005 Khair et al.
7,152,799 B2 12/2006 Nakabe
7,184,581 B2 2/2007 Johansen et al.
7,260,436 B2 8/2007 Kilgore et al.
2002/0030585 A1* 3/2002 Doi et al. ..................... 340/5.64
2002/0065711 A1 5/2002 Fujisawa et al.
2002/0109580 A1* 8/2002 Shreve et al. ................ 340/5.61

(Continued)

FOREIGN PATENT DOCUMENTS

JP 7-20249 1/1995

(Continued)

OTHER PUBLICATIONS

Kiyoaki Takiguchi, "Communication System", Patent Abstracts of Japan, pp. 1 and 2, Oct. 7, 2004, of Japanese Publication No. 2004-282733, Japan.

(Continued)

*Primary Examiner* — Walter F Briney, III

(74) *Attorney, Agent, or Firm* — Finnegan, Henderson, Farabow, Garrett & Dunner, L.L.P.

(57) ABSTRACT

A true person can be verified with ease and a high degree of reliability. An ATM communicates with a server installed in a data center to carry out a true-person verification such as an organism authentication on the basis of an operation carried out by a user prior to a transaction process to be carried out on an account assigned to the user. When the user touches a predetermined contact area provided on an operation panel of the ATM, the ATM communicates with a portable device attached to the body of the user by using the body of the user as a communication medium. The transaction process is carried out only if the true-person verification such as an organism authentication is successful and a communication with the portable device can be performed.

16 Claims, 23 Drawing Sheets

U.S. PATENT DOCUMENTS

| | | | | |
|---|---|---|---|---|
| 2002/0146032 | A1 | 10/2002 | Attimont et al. | |
| 2003/0137989 | A1 | 7/2003 | Nagai | |
| 2004/0056811 | A1 | 3/2004 | Pakray et al. | |
| 2004/0252012 | A1* | 12/2004 | Beenau et al. | 340/5.4 |
| 2006/0045118 | A1 | 3/2006 | Hyoung et al. | |
| 2006/0077616 | A1 | 4/2006 | Takiguchi | |
| 2007/0021077 | A1 | 1/2007 | Amtmann et al. | |
| 2007/0221725 | A1 | 9/2007 | Kawaguchi | |
| 2007/0222599 | A1 | 9/2007 | Coveley et al. | |

FOREIGN PATENT DOCUMENTS

| | | | |
|---|---|---|---|
| JP | 10-228524 | A | 8/1998 |
| JP | 10-229357 | | 8/1998 |
| JP | 10-232283 | | 9/1998 |
| JP | 11-509380 | | 8/1999 |
| JP | 2001-134890 | | 5/2001 |
| JP | 2001-144662 | | 5/2001 |
| JP | 2002-009710 | | 1/2002 |
| JP | 2002-157041 | A | 5/2002 |
| JP | 2002-222169 | A | 8/2002 |
| JP | 2003-063392 | | 3/2003 |
| JP | 2003-132031 | | 5/2003 |
| JP | 2003-163644 | | 6/2003 |
| JP | 2003-317042 | | 11/2003 |
| JP | 2004-088223 | A | 3/2004 |
| JP | 2004-145873 | | 5/2004 |
| JP | 2004-178219 | A | 6/2004 |
| JP | 2004-214737 | | 7/2004 |
| JP | 2004-282733 | | 10/2004 |
| JP | 2005-005787 | A | 1/2005 |
| WO | WO 2004/010618 | | 1/2004 |

OTHER PUBLICATIONS

Shigeru Tajima, “Signal Transmission System, Signal Transmitter, and Signal Receiver”, Patent Abstracts of Japan, pp. 1 and 2, Jun. 6, 2003, of Japanese Publication No. 2003-163644, Japan.

Kaneyuki Doi et al., “Data Transmission System Utilizing Human Body as Signal Transmission Path”, Patent Abstracts of Japan, pp. 1 and 2, Jan. 11, 2002, of Japanese Publication No. 2002-009710, Japan.

Haruo Oba et al., “Mobile Audio Listening Device”, Patent Abstracts of Japan, pp. 1 and 2, May 25, 2001, of Japanese Publication No. 2001-144662, Japan.

Shigeru Tajima, “Voice Guiding Device”, Patent Abstracts of Japan, pp. 1 and 2, May 18, 2001, of Japanese Publication No. 2001-134890, Japan.

English-language translation of Notification of reasons for Refusal issued on Jul. 22, 2010, by the Japanese Patent Office in a counterpart application No. 2005-087737 (4 pages).

Unconventional ubiquitous technology—human body communication (first part), Mar. 10, 2005, Mar. 10, 2005, [Search Jul. 22, 2010], Internet <URL:http://itpro.nikkeibp.co.jp/prembk/NBY/techsquare/20050304/157030/>.

Mitsuru Shinagawa, general produce activity, NTT technology journal vol. 17 No. 3, Association of corporate judicial person telecommunications, Mar. 1, 2005, vol. 17, p. 34-38.

* cited by examiner

FIG. 3

250

| FREQUENCY f [Hz] | RECEPTION LOAD Rr [Ω] | ELECTROSTATIC CAPACITANCE [F] | EFFECTIVE VOLTAGE Vrrms [V] |
|---|---|---|---|
| 1.0E+06 | 1.0E+04 | 1.0E-13 | 0.013 |
| 1.0E+06 | 1.0E+04 | 1.0E-12 | 0.125 |
| 1.0E+06 | 1.0E+04 | 1.0E-11 | 1.064 |
| 1.0E+06 | 1.0E+05 | 1.0E-13 | 0.125 |
| 1.0E+06 | 1.0E+05 | 1.0E-12 | 1.064 |
| 1.0E+06 | 1.0E+05 | 1.0E-11 | 1.975 |
| 1.0E+06 | 1.0E+06 | 1.0E-13 | 1.064 |
| 1.0E+06 | 1.0E+06 | 1.0E-12 | 1.975 |
| 1.0E+06 | 1.0E+06 | 1.0E-11 | 2.000 |
| 1.0E+07 | 1.0E+04 | 1.0E-13 | 0.125 |
| 1.0E+07 | 1.0E+04 | 1.0E-12 | 1.064 |
| 1.0E+07 | 1.0E+04 | 1.0E-11 | 1.975 |
| 1.0E+07 | 1.0E+05 | 1.0E-13 | 1.064 |
| 1.0E+07 | 1.0E+05 | 1.0E-12 | 1.975 |
| 1.0E+07 | 1.0E+05 | 1.0E-11 | 2.000 |
| 1.0E+07 | 1.0E+06 | 1.0E-13 | 1.975 |
| 1.0E+07 | 1.0E+06 | 1.0E-12 | 2.000 |
| 1.0E+07 | 1.0E+06 | 1.0E-11 | 2.000 |
| 1.0E+08 | 1.0E+04 | 1.0E-13 | 1.064 |
| 1.0E+08 | 1.0E+04 | 1.0E-12 | 1.975 |
| 1.0E+08 | 1.0E+04 | 1.0E-11 | 2.000 |
| 1.0E+08 | 1.0E+05 | 1.0E-13 | 1.975 |
| 1.0E+08 | 1.0E+05 | 1.0E-12 | 2.000 |
| 1.0E+08 | 1.0E+05 | 1.0E-11 | 2.000 |
| 1.0E+08 | 1.0E+06 | 1.0E-13 | 2.000 |
| 1.0E+08 | 1.0E+06 | 1.0E-12 | 2.000 |
| 1.0E+08 | 1.0E+06 | 1.0E-11 | 2.000 |

FIG. 16

| ACCOUNT NUMBER | NAME | DEVICE ID | ADDRESS | PHONE NUMBER | MAIL ADDRESS | INTERNET BANKING AUTHENTICATION INFORMATION | CATALOGED SETTING NUMBER | PERSONAL IDENTIFICATION NUMBERE | ORGANISM INFORMATION |
|---|---|---|---|---|---|---|---|---|---|
| 12345678 | AAA | abc123 | BBB | 9999 | zzz@xxx.co.jp | ○○○○ | NNNNNN | xxxx | abcdefg |

FIG. 17

| DEVICE ID | BANK/BRANCH NUMBER | ACCOUNT NUMBER | CATALOGED SETTING NUMBER |
|---|---|---|---|
| abc123 | 001/241 | 12345678 | NNNNNN |
| | 003/110 | 98765432 | |
| | ⋮ | ⋮ | ⋮ |

INFORMATION PROCESSING SYSTEM, INFORMATION PROCESSING APPARATUS, METHODS, PROGRAM AND RECORDING MEDIUM

CROSS REFERENCES TO RELATED APPLICATIONS

The present invention contains subject matter related to Japanese Patent Application JP 2005-087737 filed with the Japanese Patent Office on Mar. 25, 2005, the entire contents of which being incorporated herein by reference.

BACKGROUND OF THE INVENTION

The present invention relates to an information processing system, information processing apparatus, methods, a program and a recording medium. More particularly, the present invention relates to an information processing system capable of verifying the identity of a user with ease and a high degree of reliability, information processing apparatus, methods, a program and a recording medium.

In recent years, strengthening of security of financial transactions is expected. As represented by a cash card in bank transactions, for example, a combination of a magnetic card and a personal identification number (or a password) is used as conventional means for authenticating the identity of a user. Since data recorded on a magnetic card can be read out relatively with ease, however, a magnetic card can be falsified easily. In addition, a personal identification number can be seen and stolen when the user enters the personal identification number. Thus, in order to prevent a cash card from being falsified, an IC card or the like is used as a cash card. As an alternative, some financial institutions have taken a countermeasure such as an organism authentication technique capable of verifying the identity of a user even if the personal identification number of the authorized user has been stolen. The organism authentication technique is also referred to as a biometrics technique, in accordance with which, an individual is authenticated to be the true person by determining whether or not information on a living organ of the body of the individual matches information cataloged in advance as information on a living organ of the body of the person. Examples of the living organ are a fingerprint, a retina, an iris and a vein. The information on a living organ can be a characteristic quantity representing the shape of the organ or another attribute of the organ.

If a person is verified to be the true person by adoption of the organism authentication technique prior to a financial transaction, it is possible to prevent the transaction from being carried out by any other person pretending to be the true person even if the personal identification number assigned to the true person or the like has been stolen. A document such as Japanese Patent Laid-open No. 2003-132031 (referred as Patent Document 1 hereinafter) has proposed a method of enhancing security of data communications by authenticating that a specific person is the true person by collating a finger print of the specific person with a finger print cataloged in advance as a finger print of the true person.

In addition, in recent years, the radio communication has been making progress. Thus, it is expected that a diversity of services can be rendered by utilization of the radio communication in financial transactions. For example, it is expected that, by utilization of a radio transmission method using the 2.4 GHz band, exchanges of data can be implemented between apparatus without regard to whether the apparatus are personal computers, peripherals, home appliances or hand phones and, in addition, there has been proposed a technology of communications using an electric conductor different from the ordinary communication media as communications between a transmitter and a receiver. An example of the electric conductor is a human body. The radio transmission method using the 2.4 GHz band is referred to as the so-called Bluetooth communication. For more information, refer to documents such as JP-A-H11-509380 (referred as Patent Document 2 hereinafter) or Japanese Patent Laid-open No. Hei 10-229357 (referred as Patent Document 3 hereinafter).

SUMMARY OF THE INVENTION

In general, however, a transaction using an ATM (automated teller machine) is carried out by using a card even if the user of the card is verified to be the true user by adoption of the organism authentication method. In this case, the user has to manage cards. This is because, after the user of the card is verified to be the true user, the user may not necessarily operate the ATM. That is to say, the card is used as a tool for proving the validity of the operation to carry out the transaction. For example, if the user leaves the ATM after the user of the card is verified to be the true user by adoption of the organism authentication method, it is feared that another person pretends to be the true user to perform a transaction. In order to solve this problem, a card is inserted into the ATM to verify that an operation to be carried out is an operation of the true user, and a transaction can be carried out only before the card is pulled out from the ATM. In this way, another person can be prevented from operating the ATM in order to perform a transaction illegally.

In addition, when an organism authentication process is actually carried out, if information on a living organ of a specific user is collated so strictly with information cataloged in advance in order to verify that the information on a living organ matches the information cataloged in advance, the specific user may not be determined to be the true user due to some conditions of the specific user and the verifying apparatus in spite of the fact that the specific user is indeed the true user. Thus, it is necessary to make a matching condition lenient as well as widen the range of the matching condition for the information on a living organ to match the information cataloged in advance. In consequence, it is difficult to make the true-user denial rate and the other-user acceptance rate zero. The true-user denial rate is a probability of mistakenly determining that a specific user is a user other than the true user in spite of the fact that the specific user is the true user. On the other hand, the other-user denial rate is a probability of mistakenly determining that a specific user is the true user in spite of the fact that the specific user is a user other than the true user.

In accordance with a technology disclosed in Patent Document 2, on the other hand, a closed circuit is formed as a circuit connecting a transmitter, a human body, a receiver and the earth/ground to each other and, in addition, a signal is transmitted through the closed circuit. Thus, a connection between the earth/ground and the electrode of the transmitter or receiver, which is closer to the human body, is very loose so that, in essence, the closed circuit can be hardly formed. In addition, in accordance with a technology disclosed in Patent Document 3, a closed circuit is formed as a circuit connecting a transmitter, a human body, a receiver and the atmosphere to each other and, in addition, a signal is transmitted through the closed circuit. Thus, in order to connect the transmitter, the human body and the receiver through the atmosphere, the transmitter and the receiver must be placed at locations close to each other.

Accordingly, addressing the problems described above, the present invention have been devised an information processing system capable of verifying that a user is the true user with ease and a high degree of reliability, information processing apparatus employed in the information processing system and information processing methods adopted by the information processing apparatus.

An information processing system provided by the present invention as an information processing system having a terminal to be operated by a user and an information processing apparatus communicating with the terminal is wherein:

the information processing apparatus includes:

a first signal electrode for receiving and transmitting a signal transmitted through a communication medium in a communication with the terminal;

a first reference electrode for establishing a reference point used for determining the value of the signal transmitted to or received from the terminal;

a first determination section for determining whether or not a communication with the terminal is possible;

an information acquisition section for sending a request to the terminal as a request for transmission of information stored in the terminal in order to acquire the information if a determination result produced by the first determination section reveals that a communication with the terminal is possible;

an operation-input reception section for receiving an operation input entered by the user;

a second determination section for determining whether or not a communication with the terminal is going on; and a process execution section for carrying out a process on the operation input received by the operation-input reception section on the basis of the information acquired by the information acquisition section if a determination result produced by the second determination section indicates that a communication with the terminal is going on, and the terminal includes:

a second signal electrode for receiving and transmitting a signal transmitted through a communication medium in a communication with the information processing apparatus;

a second reference electrode for establishing a reference point used for determining the value of the signal transmitted to or received from the information processing apparatus;

a request determination section for determining whether or not a request has been received from the information processing apparatus as a request for transmission of information stored in the terminal; and a stored-information transmission section for transmitting the information stored in the terminal to the information processing apparatus as a signal if a determination result produced by the request determination section indicates that a request for transmission of information stored in the terminal has been received from the information processing apparatus.

In the information processing system provided by the present invention as described above, the information processing apparatus receives and transmits a signal through the communication medium in a communication with the terminal, determining whether or not a communication with the terminal can be carried out. If the result of the determination indicates that a communication with the terminal can be carried out, the information processing apparatus transmits a request to the terminal as a request for transmission of information stored in the terminal in order to acquire the information from the terminal and receives an operation input entered by the user to the operation-input reception section. The information processing apparatus then determines whether or not a communication with the terminal is going on. If the result of the determination indicates that a communication with the terminal is going on, on the basis of the information acquired from the terminal, the information processing apparatus carries out a process corresponding to the operation input entered by the user to the operation-input reception section. On the other hand, the terminal receives and transmits a signal through the communication medium in a communication with the information processing apparatus, determining whether or not a request has been received from the information processing apparatus as a request for transmission of information stored in the terminal. If the result of the determination reveals such an information transmission request, the terminal transmits the information stored in the terminal to the information processing apparatus as a signal.

An information processing apparatus provided by the present invention as an apparatus for communicating with a terminal carried by a user is wherein the information processing apparatus includes:

a signal electrode for receiving and transmitting a signal transmitted through a communication medium in a communication with the terminal;

a reference electrode for establishing a reference point used for determining the value of the signal transmitted to or received from the terminal;

a first determination section for determining whether or not a communication with the terminal is possible;

an information acquisition section for sending a request to the terminal as a request for transmission of information stored in the terminal in order to acquire the information if a determination result produced by the first determination section reveals that a communication with the terminal is possible;

an operation-input reception section for receiving an operation input entered by the user;

a second determination section for determining whether or not a communication with the terminal is going on; and a process execution section for carrying out a process on the operation input received by the operation-input reception section on the basis of the information acquired by the information acquisition section if a determination result produced by the second determination section indicates that a communication with the terminal is going on.

The information processing apparatus described above may have a configuration in which:

the signal electrode is provided as an electrode having a stronger electrostatic coupling with the communication medium than an electrostatic coupling between the reference electrode and the communication medium; and a signal corresponding to an electric-potential difference generated between the signal electrode and the reference electrode as a difference in electric potential between the signal electrode and the reference electrode is transmitted to the terminal or received from the terminal.

The information processing apparatus described above may have a configuration wherein:

the communication medium is a human body; and when the user touches the signal electrode, the first determination section determines that a communication with the terminal is possible or the second determination section determines that a communication with the terminal is going on.

The information processing apparatus described above may have a configuration further including a true-person verification section for verifying that the user is the true person on the basis of information acquired by the information acquisition section from the terminal.

The information processing apparatus described above may have a configuration in which the true-person verification section verifies that the user is the true person on the basis of a result of determination as to whether or not a personal identification number entered by the user matches a personal identification number cataloged in advance.

The information processing apparatus described above may have a configuration further including an organism-information input reception section for receiving input organism information of the user wherein the true-person verification section verifies that the user is the true person on the basis of a degree to which a characteristic quantity of the input organism information received by the organism-information input reception section matches a characteristic quantity of input organism information cataloged in advance.

The information processing apparatus described above may have a configuration further including a third determination section for determining whether or not a process can be carried out on an operation input received by the operation-input reception section on the basis of information stored in the terminal as information on executability of the process if a determination result produced by the second determination section reveals that a communication between the information processing apparatus and the terminal is going on.

The information processing apparatus described above may have a configuration in which, if the process to be carried out on an operation input received by the operation-input reception section satisfies a condition set in advance, the third determination section acquires information from the terminal as the information on executability of the process, determining whether or not the acquired information matches information cataloged in advance and, if the result of determination indicates that the acquired information matches the information cataloged in advance, determines that the process can be carried out on the operation input received by the operation-input reception section.

The information processing apparatus described above may have a configuration in which information stored in the terminal as the information on executability of the process is information received by the terminal from another information processing apparatus.

A first information processing method is provided by the present invention as an information processing method to be adopted by an information processing apparatus, which includes a signal electrode for receiving and transmitting a signal transmitted through a communication medium in a communication with a terminal carried by a user as well as a reference electrode for establishing a reference point used for determining the value of the signal transmitted to or received from the terminal and is used for communicating with the terminal on the basis of the signals transmitted to the terminal and received from the terminal by the signal electrode. The information processing method is wherein the information processing method includes:

a first determination step of determining whether or not a communication with the terminal is possible;

an information acquisition step of sending a request to the terminal as a request for transmission of information stored in the terminal in order to acquire the information if a determination result produced in a process carried out at the first determination step reveals that a communication with the terminal is possible;

an operation-input reception step of receiving an operation input entered by the user;

a second determination step of determining whether or not a communication with the terminal is going on; and a process execution step of carrying out a process on the operation input received in a process carried out at the operation-input reception step on the basis of the information acquired in a process carried out at the information acquisition step if a determination result produced in a process carried out at the second determination step indicates that a communication with the terminal is going on.

A program is provided by the present invention as a program to be executed by a computer to drive an information processing apparatus, which includes a signal electrode for receiving and transmitting a signal transmitted through a communication medium in a communication with a terminal carried by a user as well as a reference electrode for establishing a reference point used for determining a top-bottom difference of a signal and is used for communicating with the terminal on the basis of the signals transmitted to the terminal and received from the terminal by the signal electrode. The program is wherein the program includes:

a first determination control step of determining whether or not a communication with the terminal is possible;

an information acquisition control step of sending a request to the terminal as a request for transmission of information stored in the terminal in order to acquire the information if a determination result produced in a process carried out at the first determination control step reveals that a communication with the terminal is possible;

an operation-input reception control step of receiving an operation input entered by the user;

a second determination control step of controlling a result of determination as to whether or not a communication with the terminal is going on; and a process execution control step of controlling processing carried out on the operation input received in a process carried out at the operation-input reception control step on the basis of the information acquired in a process carried out at the information acquisition control step if a determination result produced in a process carried out at the second determination control step indicates that a communication with the terminal is going on.

A recording medium is provided by the present invention as a recording medium used for recording a program to be executed by a computer to drive an information processing apparatus, which includes a signal electrode for receiving and transmitting a signal transmitted through a communication medium in a communication with a terminal carried by a user as well as a reference electrode for establishing a reference point used for determining a top-bottom difference of a signal and is used for communicating with the terminal on the basis of the signals transmitted to the terminal and received from the terminal by the signal electrode. The recording medium is wherein the program includes:

a first determination control step of controlling a result of determination as to whether or not a communication with the terminal is possible;

an information acquisition control step of sending a request to the terminal as a request for transmission of information stored in the terminal in order to acquire the information if a determination result produced in a process carried out at the first determination control step reveals that a communication with the terminal is possible;

an operation-input reception control step of receiving an operation input entered by the user;

a second determination control step of controlling a result of determination as to whether or not a communication with the terminal is going on; and a process execution control step of controlling processing carried out on the operation input received in a process carried out at the operation-input reception control step on the basis of the information acquired in a process carried out at the information acquisition control step if a determination result produced in a process carried out at the second determination control step indicates that a communication with the terminal is going on.

In accordance with the information processing apparatus, the first information processing method and the program, which are provided by the present invention as described above, the information processing apparatus receives and transmits a signal through the communication medium in a communication with the terminal, determining whether or not a communication with the terminal can be carried out. If the result of the determination indicates that a communication with the terminal can be carried out, the information processing apparatus transmits a request to the terminal as a request for transmission of information stored in the terminal in order to acquire the information from the terminal and receives an operation input entered by the user to the operation-input reception section. The information processing apparatus then determines whether or not a communication with the terminal is going on. If the result of the determination indicates that a communication with the terminal is going on, on the basis of the information acquired from the terminal, the information processing apparatus carries out a process corresponding to the operation input entered by the user to the operation-input reception section.

An information processing device provided by the present invention as an information processing device to be carried by a user as a device for communicating with another information processing apparatus is wherein the information processing device includes:

a signal electrode for receiving and transmitting a signal transmitted through a communication medium in a communication with the other information processing apparatus;

a reference electrode for establishing a reference point used for determining the value of the signal transmitted to or received from the other information processing apparatus;

a request determination section for determining whether or not a request has been received from the other information processing apparatus as a request for transmission of information stored in the information processing device; and a stored-information transmission section for transmitting the information stored in the information processing device to the other information processing apparatus as a signal if a determination result produced by the request determination section indicates that a request for transmission of information stored in the information processing device has been received from the other information processing apparatus.

The information processing device can have a configuration in which:

the signal electrode is provided as an electrode having a stronger electrostatic coupling with the communication medium than an electrostatic coupling between the reference electrode and the communication medium; and a signal corresponding to an electric-potential difference generated between the signal electrode and the reference electrode as a difference in electric potential between the signal electrode and the reference electrode is transmitted to the other information processing apparatus or received from the other information processing apparatus.

A second information processing method is provided by the present invention as an information processing method to be adopted in an information processing device, which is carried by a user as a device for communicating with another information processing apparatus, includes a signal electrode for receiving and transmitting a signal transmitted through a communication medium in a communication with the other information processing apparatus as well as includes a reference electrode for establishing a reference point used for determining the value of the signal transmitted to or received from the other information processing apparatus. The second information processing method is wherein the information processing method includes:

a request determination step of producing a result of determination as to whether or not a request has been received from the other information processing apparatus as a request for transmission of information stored in the information processing device; and a stored-information transmission step of transmitting the information stored in the information processing device to the other information processing apparatus as a signal if a determination result produced in a process carried out at the request determination step indicates that a request for transmission of information stored in the information processing device has been received from the other information processing apparatus.

In accordance with the information processing device and the second information processing method, which are provided by the present invention, the information processing device receives and transmits a signal through the communication medium in a communication with the other information processing apparatus, determining whether or not a request has been received from the other information processing apparatus as a request for transmission of information stored in the information processing device. If the result of the determination reveals such an information transmission request, the information processing device transmits the information stored in the information processing device to the other information processing apparatus as a signal.

In accordance with the present invention, it is possible to verify that a person is the true person. More particularly, it is possible to verify that a person is the true person with ease and a high degree of reliability.

BRIEF DESCRIPTION OF THE DRAWINGS

FIG. 3 is a table showing typical computation results of the effective values of voltages generated between two ends of a reception load resistor included in the model shown in FIG. 2;

FIG. 16 is a diagram showing typical account information;

FIG. 17 is a diagram showing typical information stored in a storage section employed in the portable device;

DETAILED DESCRIPTION OF THE PREFERRED EMBODIMENTS

Figure 1:
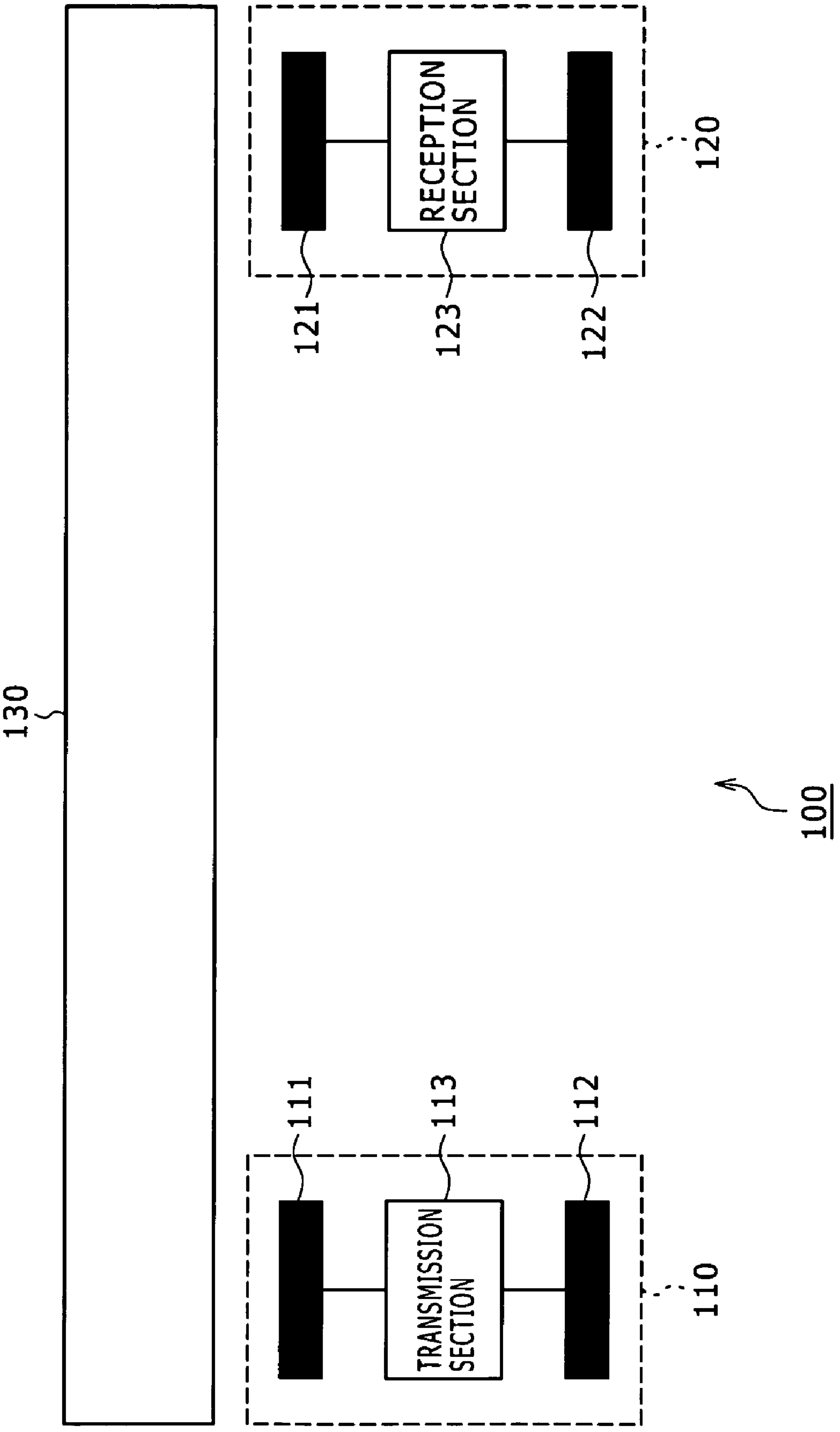
FIG. 1 is a diagram showing a typical configuration of an embodiment implementing a communication system to which the present invention is applied.

Before preferred embodiments of the present invention are explained, relations between disclosed inventions and the embodiments are explained in the following comparative description. It is to be noted that, even if there is an embodiment described in this specification but not included in the following comparative description as an embodiment corresponding to an invention, such an embodiment is not to be interpreted as an embodiment not corresponding to an invention. Conversely, an embodiment included in the following comparative description as an embodiment corresponding to a specific invention is not to be interpreted as an embodiment not corresponding to an invention other than the specific invention.

In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification or added in the future.

In accordance with an embodiment of the present invention, there is provided an information processing system including a terminal (such as a portable device 1003 included in a configuration shown in FIG. 9) to be operated by a user and an information processing apparatus (such as an ATM 1001 included in the configuration shown in FIG. 9) communicating with the terminal wherein the information processing apparatus includes:

a first signal electrode (such as a signal electrode 1068 included in a configuration shown in FIG. 11) for receiving and transmitting a signal transmitted through a communication medium in a communication with the terminal;

a first reference electrode (such as a reference electrode 1067 included in the configuration shown in FIG. 11) for establishing a reference point used for determining the value of the signal transmitted to or received from the terminal;

a first determination section (such as a control section 1044 included in a configuration shown in FIG. 10 as a section for carrying out a process at a step S201 included in a flowchart shown in FIG. 18) for producing a result of determination as to whether or not a communication with the terminal is possible;

an information acquisition section (such as the control section 1044 included in the configuration shown in FIG. 10 as a section for carrying out a process at a step S202 included in the flowchart shown in FIG. 18) for sending a request to the terminal as a request for transmission of information stored in the terminal in order to acquire the information if the first determination section determines that a communication with the terminal is possible;

an operation-input reception section (such as an input section 1041 included in the configuration shown in FIG. 10 as a section for carrying out a process at a step S205 included in the flowchart shown in FIG. 18) for receiving an operation input entered by the user;

a second determination section (such as the control section 1044 included in the configuration shown in FIG. 10 as a section for carrying out a process at a step S206 included in the flowchart shown in FIG. 18) for determining whether or not a communication with the terminal is going on; and a process execution section (such as the control section 1044 included in the configuration shown in FIG. 10 as a section for carrying out a process at a step S207 included in the flowchart shown in FIG. 18) for carrying out a process on the operation input received by the operation-input reception section on the basis of the information acquired by the information acquisition section if the second determination section determines that a communication with the terminal is going on, and the terminal includes:

a second signal electrode (such as a signal electrode 1101 included in a configuration shown in FIG. 13) for receiving and transmitting a signal transmitted through a communication medium in a communication with the information processing apparatus;

a second reference electrode (such as a reference electrode 1102 included in the configuration shown in FIG. 13) for establishing a reference point used for determining the value of the signal transmitted to or received from the information processing apparatus;

a request determination section (such as a control section 1103 included in the configuration shown in FIG. 13 as a section for carrying out a process at a step S401 included in a flowchart shown in FIG. 23) for determining whether or not a request has been received from the information processing apparatus as a request for transmission of information stored in the terminal; and a stored-information transmission section (such as the control section 1103 included in the configuration shown in FIG. 13 as a section for carrying out a process at a step S402 included in the flowchart shown in FIG. 23) for transmitting the information stored in the terminal to the information processing apparatus as a signal if the request determination section determines that a request for transmission of information stored in the terminal has been received from the information processing apparatus.

In accordance with another embodiment of the present invention, there is provided an information processing apparatus for communicating with a terminal (such as the portable device 1003 included in the configuration shown in FIG. 9) carried by a user. The information processing apparatus includes:

a first signal electrode (such as the signal electrode 1068 included in the configuration shown in FIG. 11) for receiving and transmitting a signal transmitted through a communication medium in a communication with the terminal;

a first reference electrode (such as the reference electrode 1067 included in the configuration shown in FIG. 11) for establishing a reference point used for determining the value of the signal transmitted to or received from the terminal;

a first determination section (such as the control section 1044 included in the configuration shown in FIG. 10 as a section for carrying out a process at a step S201 included in a flowchart shown in FIG. 18) for determining whether or not a communication with the terminal is possible;

an information acquisition section (such as the control section 1044 included in the configuration shown in FIG. 10 as a section for carrying out a process at a step S202 included in the flowchart shown in FIG. 18) for sending a request to the terminal as a request for transmission of information stored in the terminal in order to acquire the information if the first determination section determines that a communication with the terminal is possible;

an operation-input reception section (such as the input section 1041 included in the configuration shown in FIG. 10 as a section for carrying out a process at the step S205 included in the flowchart shown in FIG. 18) for receiving an operation input entered by the user;

a second determination section (such as the control section 1044 included in the configuration shown in FIG. 10 as a section for carrying out a process at the step S206 included in the flowchart shown in FIG. 18) for determining whether or not a communication with the terminal is going on; and a process execution section (such as the control section 1044 included in the configuration shown in FIG. 10 as a section for carrying out a process at the step S207 included in the flowchart shown in FIG. 18) for carrying out a process on the operation input received by the operation-input reception section on the basis of the information acquired by the information acquisition section if the second determination section determines that a communication with the terminal is going on.

In accordance with a further embodiment of the present invention, the information processing apparatus further has a true-person verification section (such as the control section 1044 included in the configuration shown in FIG. 10 as a section for carrying out a process at a step S203 included in the flowchart shown in FIG. 18) for verifying the identity of the user on the basis of information acquired by the information acquisition section from the terminal.

In accordance with a still further embodiment of the present invention, the information processing apparatus further has an organism-information input reception section (such as a contact section 1082 included in a configuration shown in FIG. 12) for receiving input organism information of the user, wherein the true-person verification section verifies the identity of the user on the basis of a degree to which a characteristic quantity of the input organism information received by the organism-information input reception section matches a characteristic quantity of input organism information cataloged in advance.

In accordance with a still further embodiment of the present invention, the information processing apparatus further has a third determination section (such as the control section 1044 included in the configuration shown in FIG. 10 as a section for carrying out a process at a step S375 included in the flowchart shown in FIG. 22) for determining whether or not a process can be carried out on an operation input received by the operation-input reception section on the basis of information stored in the terminal as information on executability of the process if the second determination section determines that a communication between the information processing apparatus and the terminal is going on.

In accordance with a still further embodiment of the present invention, in the information processing apparatus, if the process to be carried out on an operation input received by the operation-input reception section satisfies a condition set in advance, the third determination section acquires information (such as a cataloged setting number) from the terminal as the information on executability of the process, determining whether the acquired information matches information cataloged in advance and, if the result of determination indicates that the acquired information matches the information cataloged in advance, produces a determination result indicating that the process can be carried out on the operation input received by the operation-input reception section.

Figure 9:
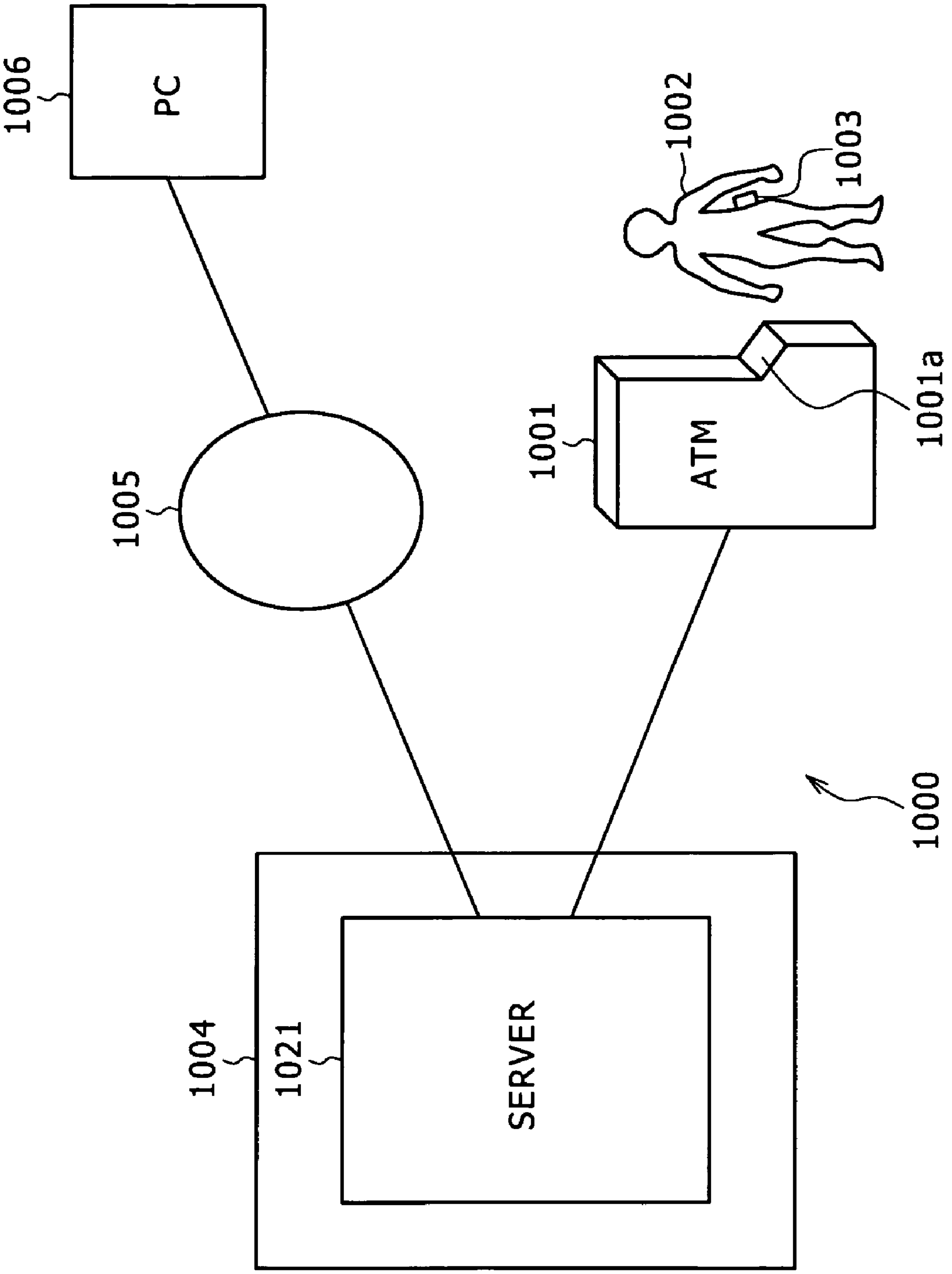
FIG. 9 is a block diagram showing a typical configuration according to an embodiment implementing a financial transaction system to which the present invention is applied.

In accordance with a still further embodiment of the present invention, in the information processing apparatus, information stored in the terminal as the information on executability of the process is information received by the terminal from another information processing apparatus (such as a personal computer 1006 included in the configuration shown in FIG. 9).

Figure 18:
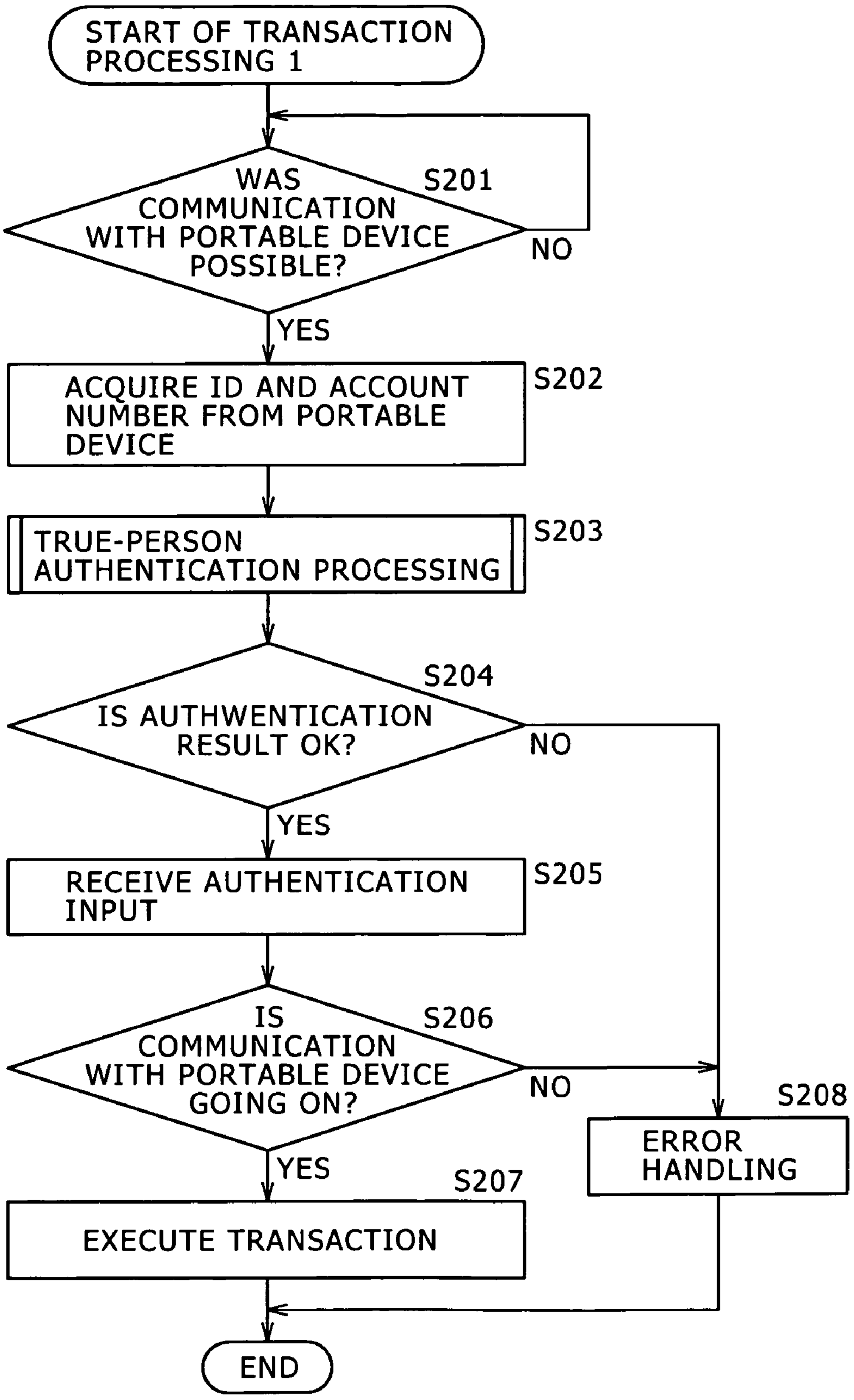
FIG. 18 shows a flowchart referred to in explanation of typical transaction processing 1.

In accordance with a still further embodiment of the present invention, there is provided an information processing method to be adopted by an information processing apparatus, which includes a signal electrode (such as the signal electrode 1068 included in the configuration shown in FIG. 11) for receiving and transmitting a signal transmitted through a communication medium from a terminal (such as the portable device 1003 included in the configuration shown in FIG. 9) carried by a user in a communication with the terminal as well as a reference electrode (such as the reference electrode 1067 included in the configuration shown in FIG. 11) for establishing a reference point used for determining the value of the signal transmitted to or received from the terminal and is used for communicating with the terminal on the basis of the signals transmitted to and received from the terminal by the signal electrode. The information processing method includes:

a first determination step (such as a process carried out at the step S201 included in the flowchart shown in FIG. 18) of determining whether or not a communication with the terminal is possible;

an information acquisition step (such as a process carried out at the step S202 included in the flowchart shown in FIG. 18) of sending a request to the terminal as a request for transmission of information stored in the terminal in order to acquire the information if a determination result produced in a process carried out at the first determination step determines that a communication with the terminal is possible;

an operation-input reception step (such as a process carried out at the step S205 included in the flowchart shown in FIG. 18) of receiving an operation input entered by the user;

a second determination step (such as a process carried out at the step S206 included in the flowchart shown in FIG. 18) of determining whether or not a communication with the terminal is going on; and a process execution step (such as a process carried out at the step S207 included in the flowchart shown in FIG. 18) of carrying out a process on the operation input received in a process carried out at the operation-input reception step on the basis of the information acquired in a process carried out at the information acquisition step if the second determination step determines that a communication with the terminal is going on.

In accordance with a still further embodiment of the present invention, there is provided a program to be executed by a computer to drive an information processing apparatus, which includes a signal electrode (such as the signal electrode 1068 included in the configuration shown in FIG. 11) for receiving and transmitting a signal transmitted through a communication medium from a terminal (such as the portable device 1003 included in a configuration shown in FIG. 9) carried by a user in a communication with the terminal as well as a reference electrode (such as the reference electrode 1067 included in the configuration shown in FIG. 11) for establishing a reference point used for determining the difference between the high signal and low signal and is used for communicating with the terminal on the basis of the signals transmitted to the terminal and received from the terminal by the signal electrode, to carry out:

a first determination control step (such as a process carried out at the step S201 included in the flowchart shown in FIG. 18) of determining whether or not a communication with the terminal is possible;

an information acquisition control step (such as a process carried out at the step S202 included in the flowchart shown in FIG. 18) of sending a request to the terminal as a request for transmission of information stored in the terminal in order to acquire the information if the first determination control step determines that a communication with the terminal is possible;

an operation-input reception control step (such as a process carried out at the step S205 included in the flowchart shown in FIG. 18) of receiving an operation input entered by the user;

a second determination control step (such as a process carried out at the step S206 included in the flowchart shown in FIG. 18) of controlling a result of determination as to whether or not a communication with the terminal is going on; and a process execution control step (such as a process carried out at the step S207 included in the flowchart shown in FIG. 18) of controlling processing carried out on the operation input received in a process carried out at the operation-input reception control step on the basis of the information acquired in a process carried out at the information acquisition control step if the second determination control step determines that a communication with the terminal is going on.

In accordance with a still further embodiment of the present invention, there is provided a recording medium used for recording a program to be executed by a computer to drive an information processing apparatus (such as the ATM 1001 shown in FIG. 10), which includes a signal electrode (such as the signal electrode 1068 included in the configuration shown in FIG. 11) for receiving and transmitting a signal transmitted through a communication medium from a terminal (such as the portable device 1003 included in a configuration shown in FIG. 9) carried by a user in a communication with the terminal as well as a reference electrode (such as the reference electrode 1067 included in the configuration shown in FIG. 11) for establishing a reference point used for determining a top-bottom difference of a signal and is used for communicating with the terminal on the basis of the signals transmitted to the terminal and received from the terminal by the signal electrode, to carry out:

a first determination control step (such as a process carried out at the step S201 included in the flowchart shown in FIG. 18) of determining whether or not a communication with the terminal is possible;

an information acquisition control step (such as a process carried out at the step S202 included in the flowchart shown in FIG. 18) of sending a request to the terminal as a request for transmission of information stored in the terminal in order to acquire the information if the first determination control step determines that a communication with the terminal is possible;

an operation-input reception control step (such as a process carried out at the step S205 included in the flowchart shown in FIG. 18) of receiving an operation input entered by the user;

a second determination control step (such as a process carried out at the step S206 included in the flowchart shown in FIG. 18) of controlling a result of determination as to whether or not a communication with the terminal is going on; and a process execution control step (such as a process carried out at the step S207 included in the flowchart shown in FIG. 18) of controlling processing carried out on the operation input received in a process carried out at the operation-input reception control step on the basis of the information acquired in a process carried out at the information acquisition control step if the second determination control step determines that a communication with the terminal is going on.

In accordance with a still further embodiment of the present invention, there is provided an information processing device (such as the portable device 1003 included in the configuration shown in FIG. 9) carried by a user as a device for communicating with another information processing apparatus (such as the ATM 1001 included in the configuration shown in FIG. 9). The information processing device includes:

a signal electrode (such as the signal electrode 1101 included in the configuration shown in FIG. 13) for receiving and transmitting a signal transmitted through a communication medium in a communication with the other information processing apparatus;

a reference electrode (such as the reference electrode 1102 included in the configuration shown in FIG. 13) for establishing a reference point used for determining the value of the signal transmitted to or received from the other information processing apparatus;

a request determination section (such as the control section 1103 included in the configuration shown in FIG. 13 as a section for carrying out a process at the step S401 included in the flowchart shown in FIG. 23) for determining whether or not a request has been received from the other information processing apparatus as a request for transmission of information stored in the information processing device; and a stored-information transmission section (such as the control section 1103 included in the configuration shown in FIG. 13 as a section for carrying out a process at the step S402 included in the flowchart shown in FIG. 23) for transmitting the information stored in the information processing device to the other information processing apparatus as a signal if the request determination section determines that a request for transmission of information stored in the information processing device has been received from the other information processing apparatus.

Figure 23:
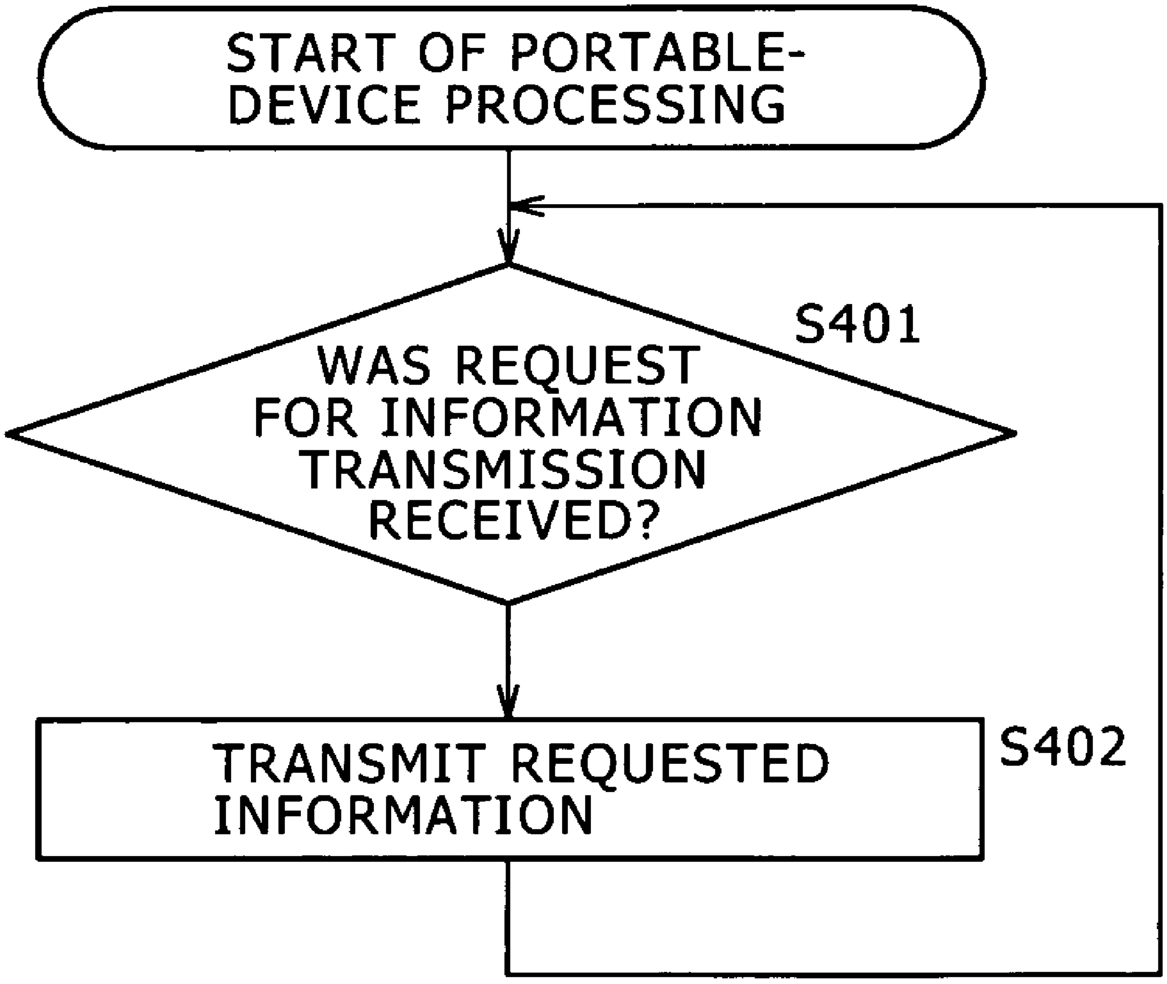
FIG. 23 shows a flowchart referred to in explanation of typical processing carried out by the portable device.

In accordance with a still further embodiment of the present invention, there is provided an information processing method to be adopted in an information processing device (such as the portable device 1003 included in a configuration shown in FIG. 9), which is carried by a user as a device for communicating with another information processing apparatus (such as the ATM 1001 included in the configuration shown in FIG. 9), includes a signal electrode (such as the signal electrode 1101 included in the configuration shown in FIG. 13) for receiving and transmitting a signal transmitted through a communication medium in a communication with the other information processing apparatus as well as a reference electrode (such as the reference electrode 1102 included in the configuration shown in FIG. 13) for establishing a reference point used for determining the value of the signal transmitted to or received from the other information processing apparatus and is used for communicating with the other information processing apparatus on the basis of the signals transmitted to and received from the other information processing apparatus by the signal electrode. The information processing method includes:

a request determination step (such as a process carried out at the step S401 included in the flowchart shown in FIG. 23) of determining whether or not a request has been received from the other information processing apparatus as a request for transmission of information stored in the information processing device; and a stored-information transmission step (such as a process carried out at the step S402 included in the flowchart shown in FIG. 23) of transmitting the information stored in the information processing device to the other information processing apparatus as a signal if the request determination step determines that a request for transmission of information stored in the information processing device has been received from the other information processing apparatus.

Embodiments of the present invention are explained by referring to diagrams as follows. First of all, radio communications carried out in the present invention are explained in detail by referring to FIGS. 1 to 8 as follows.

FIG. 1 is a diagram showing a typical configuration of an embodiment implementing a communication system to which the present invention is applied.

In the typical configuration shown in FIG. 1, the communication system 100 includes a transmission apparatus 110, a reception apparatus 120 and a communication medium 130. In the communication system 100, the transmission apparatus 110 and the reception apparatus 120 exchange signals through the communication medium 130. That is to say, in the communication system 100, the reception apparatus 120 receives a signal transmitted by the transmission apparatus 110 by way of the communication medium 130.

The transmission apparatus 110 includes a transmission signal electrode 111, a transmission reference electrode 112 and a transmission section 113. The transmission signal electrode 111 is an electrode for transmitting a signal to the reception apparatus 120 by way of the communication medium 130. The transmission reference electrode 112 is an electrode for establishing a reference point used for determining a top-bottom difference of a signal. The transmission signal electrode 111 is provided as an electrode having a strong electrostatic coupling with the communication medium 130 in comparison with the electrostatic coupling between the transmission reference electrode 112 and the communication medium 130. The transmission section 113 is an electrode provided between the transmission signal electrode 111 and the transmission reference electrode 112. The transmission section 113 generates a signal to be transmitted by the transmission signal electrode 111 to the reception apparatus 120 as an electronic signal representing a difference in electric potential between the transmission signal electrode 111 and the transmission reference electrode 112.

The reception apparatus 120 includes a reception signal electrode 121, a reception reference electrode 122 and a reception section 123. The reception signal electrode 121 is an electrode for receiving a signal transmitted by the transmission apparatus 110 by way of the communication medium 130. The reception reference electrode 122 is an electrode for establishing a reference point used for determining a top-bottom difference of a signal. The reception signal electrode 121 is provided as an electrode having a strong electrostatic coupling with the communication medium 130 in comparison with the electrostatic coupling between the reception reference electrode 122 and the communication medium 130. The reception section 123 is an electrode provided between the reception signal electrode 121 and the reception reference electrode 122. The reception section 123 converts a signal (a difference in electric potential) generated between the reception signal electrode 121 and the reception reference electrode 122 into a desired electrical signal in order to restore an electrical signal generated by the transmission section 113 employed in the transmission apparatus 110.

The communication medium 130 is typically made of a material having a physical characteristic capable of transmitting an electrical signal. Examples of such material are an electric conductor and a dielectric substance. Typically, the communication medium 130 is made of an electric conductor. A representative electric conductor is a metal such as the copper, the iron and the aluminum. As an alternative, the communication medium 130 is made of pure water, rubber, crystal or an electrolyte solution such as salt solution. As another alternative, the communication medium 130 is made of a dielectric material such as an organism, which is a compound of pure water, rubber and an electrolyte solution. The communication medium 130 can have any arbitrary shape such as a wire shape, a plate shape, a ball shape, an angular-pillar shape or a cylindrical-pillar shape.

With regard to such a communication system 100, first of all, relations between the electrodes and the communication medium or a peripheral space are explained. It is to be noted that, for the sake of convenience in the following description, the communication medium 130 is assumed to be a medium made completely of an electric conductor. In addition, a space exists between the transmission signal electrode 111 and the communication medium 130 whereas another space exists between the reception signal electrode 121 and the communication medium 130. However, no electrical coupling exists in either the space between the transmission signal electrode 111 and the communication medium 130 or the other space between the reception signal electrode 121 and the communication medium 130. That is to say, an electrostatic capacitance is formed between the transmission signal electrode 111 and the communication medium 130 whereas another electrostatic capacitance is formed between the reception signal electrode 121 and the communication medium 130.

The transmission reference electrode 112 is oriented in a direction toward a space surrounding the transmission apparatus 110. By the same token, the reception reference electrode 122 is oriented in a direction toward a space surrounding the reception apparatus 120. In general, if an electric conductor exists in a space, an electrostatic capacitance exists in a space in close proximity to the surface of the electric conductor. Let us assume for example that the electric conductor has a spherical shape having a radius r [m]. In this case, the electrostatic capacitance C associated with the electric conductor can be found from Equation (1) given as follows:

$$C=4\times\pi\times\in\times r \quad (1)$$

In Equation (1), notation π denotes the circular constant and notation ∈ denotes the dielectric constant of a medium surrounding the electric conductor. The dielectric constant ∈ is expressed by Equation (2) as follows:

$$\in=\in_r\times\in_o \quad (2)$$

In Equation (2), notation $\in_o$ denotes the dielectric constant of the vacuum. The dielectric constant $\in_o$ of the vacuum has a value of 8.854×10−12 [F/m]. Notation $\in_r$ denotes a relative dielectric constant, which is a ratio of the dielectric constant ∈ to the dielectric constant $\in_o$ of the vacuum.

As shown in Equation (1) given above, the larger the radius r, the larger the electrostatic capacitance C. It is to be noted that, in general, the magnitude of the electrostatic capacitance C of an electric conductor having a complex shape other than the spherical shape cannot be expressed by a simple expression such as the expression on the right-hand side of Equation (1). Nevertheless, it is obvious that the magnitude of the electrostatic capacitance C of an electric conductor changes with the size of the surface area.

As described above, the transmission reference electrode 112 forms an electrostatic capacitance for a space surrounding the transmission apparatus 110 whereas the reception reference electrode 122 forms an electrostatic capacitance for a space surrounding the reception apparatus 120. That is to say, if seen from a virtual infinite-point outside the transmission apparatus 110 and the reception apparatus 120, it is known that the electric potentials of the transmission reference electrode 112 and the reception reference electrode 122 are fixed and difficult to change.

The following description explains the principle of a communication mechanism in the communication system 100. It is to be noted that, for the sake of convenience of the explanation or in dependence on the context and the like, a capacitor may be referred to simply as an electrostatic capacitance. That is to say, in the following description, an electrostatic capacitance may have the same meaning as a capacitor.

In addition, in the following description, it is assumed that the transmission apparatus 110 and reception apparatus 120 in the communication system 100 shown in FIG. 1 are placed at locations separated from each other by a sufficiently long distance so that mutual influence can be ignored. On top of that, in the transmission apparatus 110, the transmission signal electrode 111 is in an electrostatic coupling only with the communication medium 130. Also, the transmission reference electrode 112 is placed at a position separated by a sufficiently long distance from the position of the transmission signal electrode 111 so that mutual influence can be ignored, that is, there is no electrostatic coupling between the transmission signal electrode 111 and the transmission reference electrode 112. By the same token, in the reception apparatus 120, the reception signal electrode 121 is in an electrostatic coupling only with the communication medium 130 and the reception reference electrode 122 is placed at a position separated by a sufficiently long distance from the position of the reception signal electrode 121 so that mutual influence can be ignored, that is, there is no electrostatic coupling between the reception signal electrode 121 and the reception reference electrode 122. Furthermore, since the transmission signal electrode 111, the reception signal electrode 121 and the communication medium 130 are each located in a space, each forms an electrostatic capacitance for the respective space. For the sake of convenience of the explanation, however, such an electrostatic capacitance can be ignored.

Figure 2:
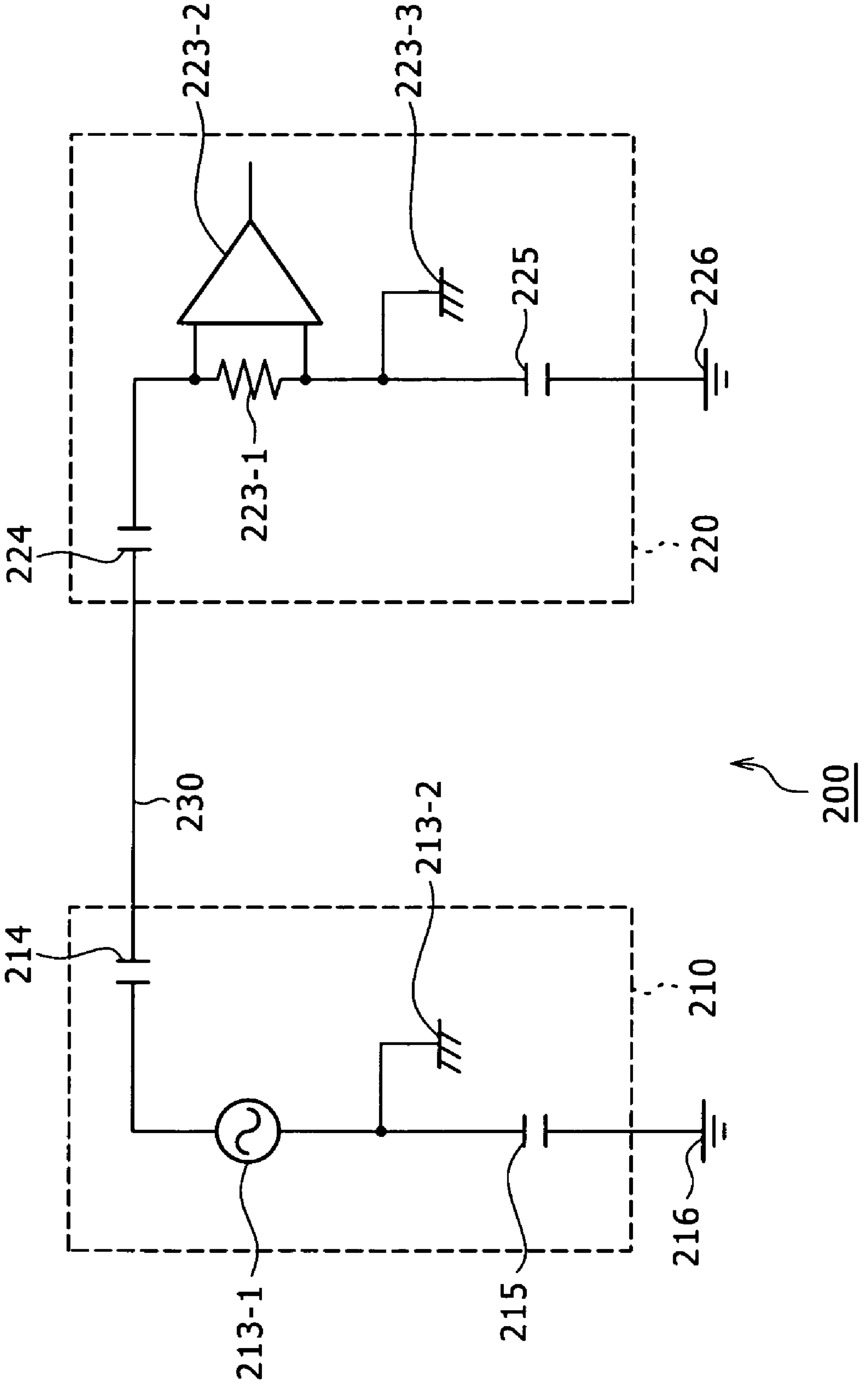
FIG. 2 is a diagram showing an equivalent circuit of the communication system shown in FIG. 1 as a communication system in an ideal state.

FIG. 2 is a diagram showing an equivalent circuit of the communication system 100 shown in FIG. 1. To be more specific, a communication system 200 shown in FIG. 2 is the equivalent circuit of the communication system 100 and, hence, virtually equivalent to the communication system 100.

As shown in FIG. 2, the communication system 200 includes a transmission apparatus 210, a reception apparatus 220 and a connection line 230. The transmission apparatus 210 corresponds to the transmission apparatus 110 employed in the communication system 100 shown in FIG. 1. By the same token, the reception apparatus 220 corresponds to the reception apparatus 120 employed in the communication system 100 shown in FIG. 1. In the same way, the connection line 230 corresponds to the communication medium 130 employed in the communication system 100 shown in FIG. 1.

In the transmission apparatus 210 employed in the communication system 200 shown in FIG. 2, a signal source 213-1 and a ground point 213-2 correspond to the transmission section 113 employed in the communication system 100 shown in FIG. 1. The signal source 213-1 generates a sinusoidal wave with a specific period of ω×t [rad] as a signal to be transmitted where notation t denotes a time period [s] and notation ω denotes an angular frequency [rad/s], which can be expressed by Equation (3) as follows:

$$\omega=2\times\pi\times f \quad (3)$$

In Equation (3), notation π denotes the circular constant and notation f denotes the frequency [Hz] of the signal generated by the signal source 213-1. The ground point 213-2 is a point connected to the ground of a circuit in the transmission apparatus 210. That is to say, one of two terminals of the signal source 213-1 is set at a predetermined reference electric potential of the circuit in the transmission apparatus 210.

A Cte 214 is a capacitor representing an electrostatic capacitance between the transmission signal electrode 111 and the communication medium 130, which are employed in the communication system 100 shown in FIG. 1. That is to say, the Cte 214 is provided between the connection line 230 and a terminal provided on the side opposite to the ground point 213-2 as a terminal of the signal source 213-1. A Ctg 215 is a capacitor representing a space electrostatic capacitance of the transmission reference electrode 112 employed in the communication system 100 shown in FIG. 1. A space electrostatic capacitance of a device is an electrostatic capacitance formed for a space in which the device exists. The Ctg 215 is provided between a terminal provided on the same side as the ground point 213-2 as a terminal of the signal source 213-1 and a ground point 216, which is an infinite-point (or a virtual point) existing in a space as a point taking the transmission apparatus 110 as a reference.

In the reception apparatus 220 employed in the communication system 200 shown in FIG. 2, an Rr 223-1, a detector 223-2 and a ground point 223-3 correspond to the reception section 123 employed in the communication system 100 shown in FIG. 1. The Rr 223-1 is a load resistor (or a reception load) used for detecting a received signal. An amplifier serving as the detector 223-2 is an amplifier for detecting a difference in electric potential between the two terminal ends of the Rr 223-1 to amplify the detected electric-potential difference. The ground point 223-3 is a point connected to the ground of a circuit in the reception apparatus 220. That is to say, one of ends of the Rr 223-1 (or one of two terminals of the detector 223-2) is set to a predetermined reference electric potential of the circuit in the reception apparatus 220.

It is to be noted that the detector 223-2 may further have other functions such as a function to demodulate a detected modulated signal and a function to decode coded information conveyed by the detected signal.

A Cre 224 is a capacitor representing an electrostatic capacitance between the reception signal electrode 121 and the communication medium 130, which are employed in the communication system 100 shown in FIG. 1. That is to say, the Cre 224 is provided between the connection line 230 and a terminal provided on the side opposite to the ground point 223-3 as a terminal of the Rr 223-1. A Crg 225 is a capacitor representing a space electrostatic capacitance of the reception reference electrode 122 employed in the communication system 100 shown in FIG. 1. As described earlier, a space electrostatic capacitance of a device is an electrostatic capacitance formed for a space in which the device exists. The Crg 225 is provided between a terminal provided on the same side as the ground point 223-3 as a terminal of the Rr 223-1 and a ground point 226, which is an infinite-point (or a virtual point) existing in a space as a point taking the reception apparatus 120 as a reference.

As described above, the connection line 230 corresponds to the communication medium 130, which is a perfect electric conductor. In the communication system 200 shown in FIG. 2, the Ctg 215 and the Crg 225 are included as capacitors electrically connected to each other in the equivalent circuit through the ground point 216 and the ground point 226. It is to be noted, however, that it is not necessary to actually connect the Ctg 215 and the Crg 225 electrically to each other. That is to say, the Ctg 215 is an electrostatic capacitance merely formed for a space surrounding the transmission apparatus 210 while the Crg 225 is a electrostatic capacitance merely formed for a space surrounding the reception apparatus 220. In other words, it is not necessary to connect the ground point 216 and the ground point 226 electrically to each other, or the ground point 216 and the ground point 226 can be capacitors independent of each other.

As described above, an electrostatic capacitance is always formed for a space surrounding an electric conductor as a electrostatic capacitance having a magnitude proportional to the area of the surface of the electric conductor. That is to say, for example, the transmission apparatus 210 and the reception apparatus 220 may be placed at locations separated from each other with any length. If the communication medium 130 employed in the communication system 100 shown in FIG. 1 is a perfect electric conductor, for example, the electric conductivity of the connection line 230 may be assumed to be infinite. Thus, the length of the connection line 230 does not have an effect on communications between the transmission apparatus 210 and the reception apparatus 220. It is to be noted that, if the communication medium 130 is an electric conductor with a sufficiently high electric conductivity, practically, the distance between the transmission apparatus 210 and the reception apparatus 220 does not have any effect on stability in communication.

The communication system 200 has a circuit including the signal source 213-1, the Rr 223-1, the Cte 214, the Ctg 215, the Cre 224 and the Crg 225. The compound electrostatic capacitance $C_x$ of the 4 capacitors, i.e., the Cte 214, the Ctg 215, the Cre 224 and the Crg 225, is expressed by Equation (4) as follows:

$$C_x = \frac{1}{1/Cte + 1/Ctg + 1/Cre + 1/Crg}[F] \quad (4)$$

A sinusoidal wave Vt(t) generated by the signal source 213-1 is expressed by Equation (5) as follows:

$$V_t(t)=V_m \times \sin(\omega t+\theta)\ [\text{V}] \quad (5)$$

In the above equation, notation $V_m$ denotes a maximum amplitude voltage [V] of a signal generated by the signal source 213-1 and notation θ denotes an initial phase angle [rad]. That is to say, the effective value $V_{trms}$ of a voltage generated by the signal source 213-1 can be found by using Equation (6) as follows:

$$V_{trms}=V_m/\sqrt{2}\ [V] \quad (6)$$

A compound impedance Z of the entire circuit can be found by using Equation (7) as follows:

$$\begin{aligned} Z &= \sqrt{Rr^2 + 1/(\omega C_x)^2} \\ &= \sqrt{Rr^2 + 1/(2\pi f C_x)^2}\ [\Omega] \end{aligned} \quad (7)$$

That is to say, the effective value Vrrms of a voltage appearing between the two ends of the Rr 223-1 can be found by using Equation (8) as follows:

$$\begin{aligned} V_{rrms} &= \frac{Rr}{Z} \times V_{trms} \\ &= \frac{Rr}{\sqrt{Rr^2 + 1/(2\pi f C_x)^2}} \times V_{trms}[\text{V}] \end{aligned} \quad (8)$$

Thus, as is obvious from Equation (8), for a larger resistance of the Rr 223-1, a larger electrostatic capacitance $C_x$ and a higher frequency f [Hz] of the signal source 213-1, the value of the expression $1/((2\times\pi\times f\times C_x)^2)$ decreases and, hence, the magnitude of the signal generated between the 2 ends of the Rr 223-1 increases.

Table 250 of FIG. 3 shows computation results of the effective value $V_{rrms}$ of a voltage appearing between the two ends of the Rr 223-1 representing a reception load. The computation results are obtained as results of computation assuming that the effective value $V_{trms}$ of a voltage signal generated by the signal source 213-1 employed in the transmission apparatus 210 is 2 [V], the frequencies f of the signal generated by the signal source 213-1 is 1 [MHz], 10 [MHz] and 100 [MHz], the resistances of the Rr 223-1 are 10 K [Ω], 100 K [Ω] and 1M [Ω] and the electrostatic capacitances Cx of the entire circuit are 0.1 [pF], 1 [pF] and 10 [pF].

As shown in Table 250, under the same other conditions, the computation result of the effective value $V_{rrms}$ for a frequency f of 10 [MHz] is greater than the computation result of the effective value $V_{rrms}$ for a frequency f of 1 [MHz], the computation result of the effective value $V_{rrms}$ for the Rr 223-1 with a resistance of 1 M [Ω] is greater than the computation result of the effective value $V_{rrms}$ for the Rr 223-1 with a resistance of 10 K [Ω] and the computation result of the effective value $V_{rrms}$ for an electrostatic capacitance $C_x$ of 10 [pF] is greater than the computation result of the effective value $V_{rrms}$ for an electrostatic capacitance $C_x$ of 0.1 [pF]. That is to say, for a higher frequency f, a larger resistance of the Rr223-1 and a larger electrostatic capacitance $C_x$, a larger effective value $V_{rrms}$ is obtained.

In addition, also as is obvious from Table 250, even for an electrostatic capacitance $C_x$ of 1 [pF] or smaller, an electrical signal is still generated between the two ends of the Rr 223-1.

That is to say, if the level of the transmitted signal is very low, a communication can still be carried out by amplifying a signal detected by the detector 223-2 employed in the reception apparatus 220.

From the above results of computation, as the basic principle, by using an electrostatic capacitance formed for a space, a signal can be transmitted from the transmission apparatus to the reception apparatus.

An electrostatic capacitance can be formed for a space surrounding the transmission reference electrode and the reception reference electrode provided that such spaces exist. Thus, the transmission apparatus and the reception apparatus are capable of providing communication stability independently of the distance between the transmission apparatus and the reception apparatus provided that the transmission signal electrode employed in the transmission apparatus and the reception signal electrode employed in the reception apparatus are coupled with each other by a communication medium.

Figure 4:
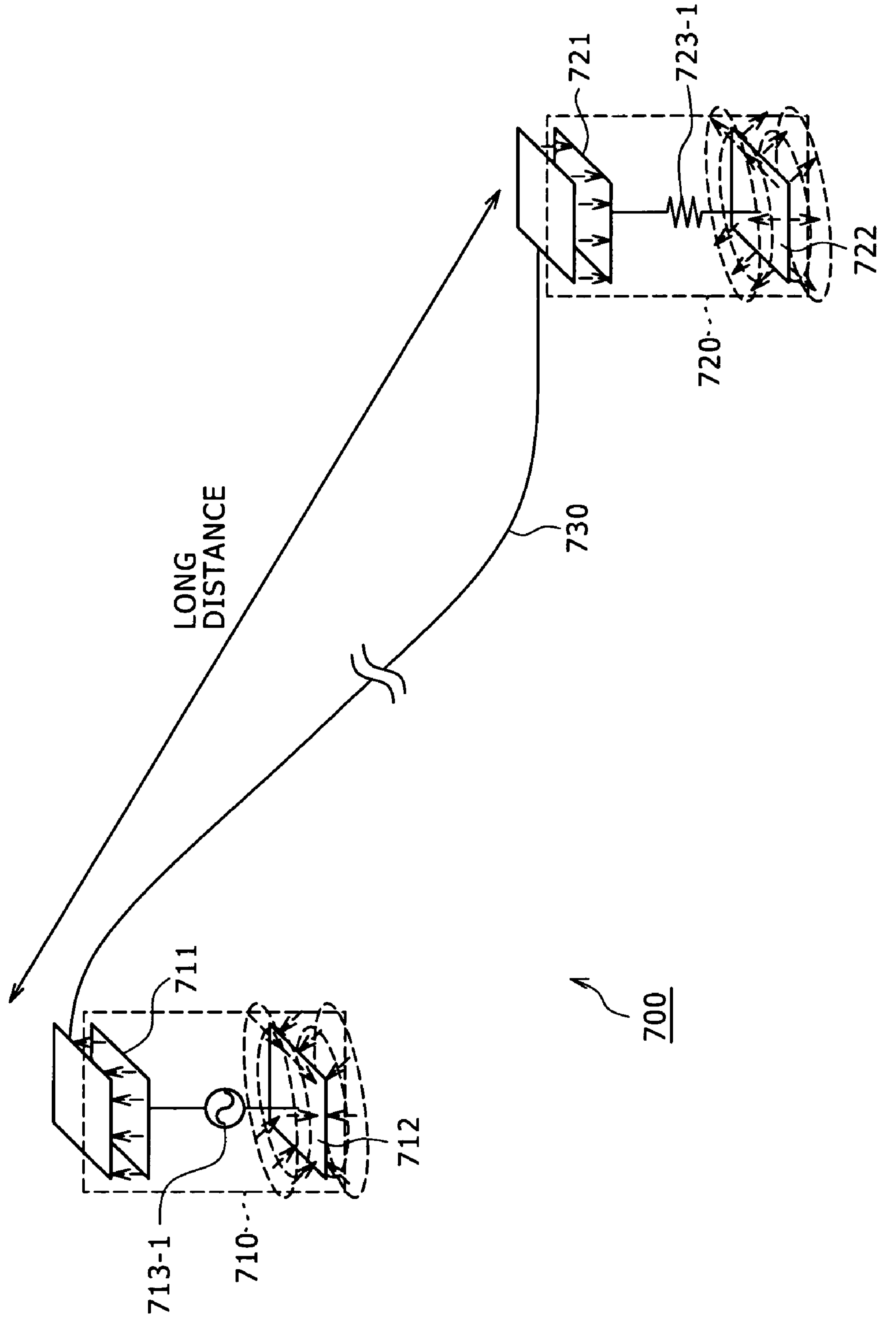
FIG. 4 is a diagram showing a typical layout of the communication system shown in FIG. 1.

The following description explains an effect of the distance between the transmission apparatus and the reception apparatus on a communication. As described above, in accordance with the principle of the present invention, if a sufficiently large electrostatic capacitance can be formed for a space surrounding the transmission reference electrode and the reception reference electrode, it is possible to provide communication stability independently of the distance between the transmission apparatus and the reception apparatus without requiring ground paths in close proximity to the transmission apparatus and the reception apparatus and other electrical paths. Thus, for example, in a communication system 700, a transmission apparatus 710 and a reception apparatus 720 are located away from one another as shown in FIG. 4, and a communication between the transmission apparatus 710 and the reception apparatus 720 can be carried out by electrically coupling a transmission signal electrode 711 employed in the transmission apparatus 710 with a reception signal electrode 721 employed in the reception apparatus 720 through a communication medium 730 having a sufficiently large electrical conductivity or a sufficiently large dielectric constant. In this case, a transmission reference electrode 712 has an electrostatic coupling with a space outside the transmission apparatus 710 whereas a reception reference electrode 722 has an electrostatic coupling with a space outside the reception apparatus 720. Thus, it is not necessary to set an electrostatic coupling between the transmission reference electrode 712 and the reception reference electrode 722. If the communication medium 730 becomes longer and thicker, however, an electrostatic capacitance for a space in close proximity to the communication medium 730 increases. Thus, it is necessary to consider the sizes of the communication medium 730 and the electrostatic capacitance associated with the communication medium 730 in determining parameters.

It is to be noted that the communication system 700 shown in FIG. 4 corresponds to the communication system 100 shown in FIG. 1. By the same token, the transmission apparatus 710 corresponds to the transmission apparatus 110 and the reception apparatus 720 corresponds to the reception apparatus 120. In the same way, the communication medium 730 corresponds to the communication medium 130.

The transmission signal electrode 711, the transmission reference electrode 712 and a signal source 713-1, which are employed in the transmission apparatus 710, correspond to the transmission signal electrode 111, the transmission reference electrode 112 and the transmission section 113 (or a portion thereof) respectively. By the same token, the reception signal electrode 721, the reception reference electrode 722 and a reception load 723-1, which are employed in the reception apparatus 720, correspond to the reception signal electrode 121, the reception reference electrode 122 and the reception section 123 (or a portion thereof) respectively.

For the reasons described above, the transmission signal electrode 711, the transmission reference electrode 712, the signal source 713-1, the reception signal electrode 721, the reception reference electrode 722 and the reception load 723-1 are not explained.

As described above, the communication system 700 is capable of implementing communications through only a communication signal transmission path without requiring a physical reference point path.

In accordance with the above descriptions, the transmission signal electrode and the reception signal electrode are in no contact with the communication medium. It is to be noted, however, that the scope of the present invention is not limited to this scheme. For example, the transmission signal electrode and the reception signal electrode can be connected to each other by a communication medium having an electrical conductivity characteristic provided that a sufficiently large electrostatic capacitance is formed in a space between the transmission signal electrode and the communication medium and between the reception signal electrode and the communication medium.

Figure 5:
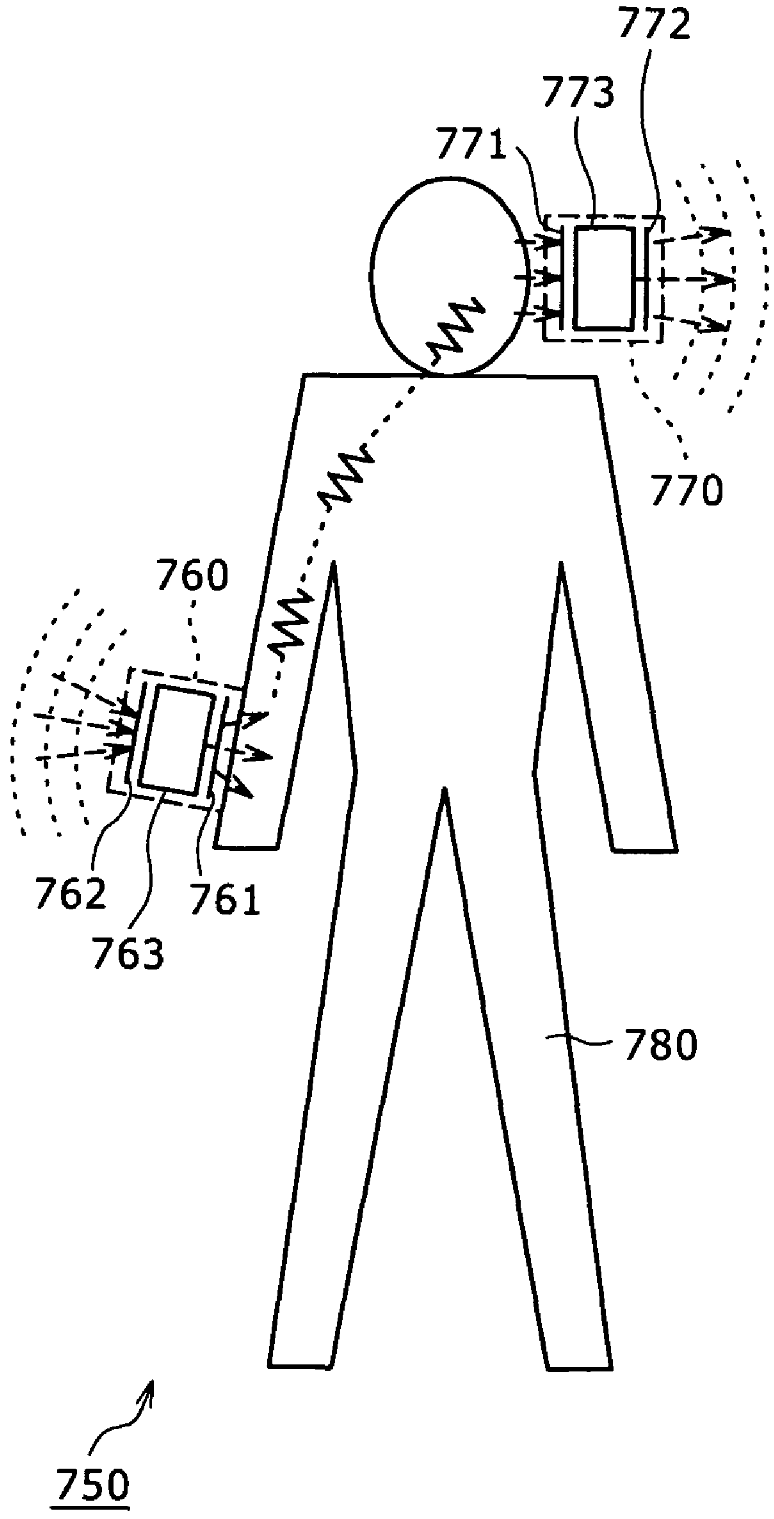
FIG. 5 is a diagram showing actual typical utilization of the present invention to an embodiment implementing a communication system.

The following description explains a concrete typical application of the communication systems described above. In the case of the communication systems described above, for example, an organism can be used as the communication medium. FIG. 5 is a diagram showing a model of a typical communication system in which communications are carried out through a human body. In the communication system 750 shown in FIG. 5, musical data is transmitted from a transmission apparatus 760 attached to an arm of a human body of the user to a reception apparatus 770 attached to the head of the same human body. The reception apparatus 770 receives musical data and converts the received data into a sound to be heard by the user. The communication system 750 corresponds to the communication systems (such as the communication system 100) described above. Thus, the transmission apparatus 760 and the reception apparatus 770 correspond to the transmission apparatus 110 and the reception apparatus 120 respectively. In addition, the human body 780 in the communication system 750 serves as the communication medium, corresponding to the communication medium 130 employed in the communication system 100 shown in FIG. 1.

The transmission apparatus 760 includes a transmission signal electrode 761, a transmission reference electrode 762 and a transmission section 763, which correspond to respectively the transmission signal electrode 111, transmission reference electrode 112 and transmission section 113 employed in the communication system 100 shown in FIG. 1. On the other hand, the reception apparatus 770 includes a reception signal electrode 771, a reception reference electrode 772 and a reception section 773, which correspond to respectively the reception signal electrode 121, reception reference electrode 122 and reception section 123 employed in the communication system 100 shown in FIG. 1.

Thus, the transmission apparatus 760 is attached to the arm of the human body 780 in such a way that the transmission signal electrode 761 is brought into contact with the arm or placed at a position in close proximity to the arm. By the same token, the reception apparatus 770 is attached to the head of the human body 780 in such a way that the reception signal electrode 771 is brought into contact with the head or placed at a position in close proximity to the head. The transmission reference electrode 762 and the reception reference electrode 772 do not have to be electrically coupled with the surrounding atmosphere, such as the earth or electrically couple the transmission apparatus 760 with the reception apparatus 770 or the transmission reference electrode 762 with the reception reference electrode 772, but need to form an electrostatic capacitance with a surrounding space.

Figure 6:
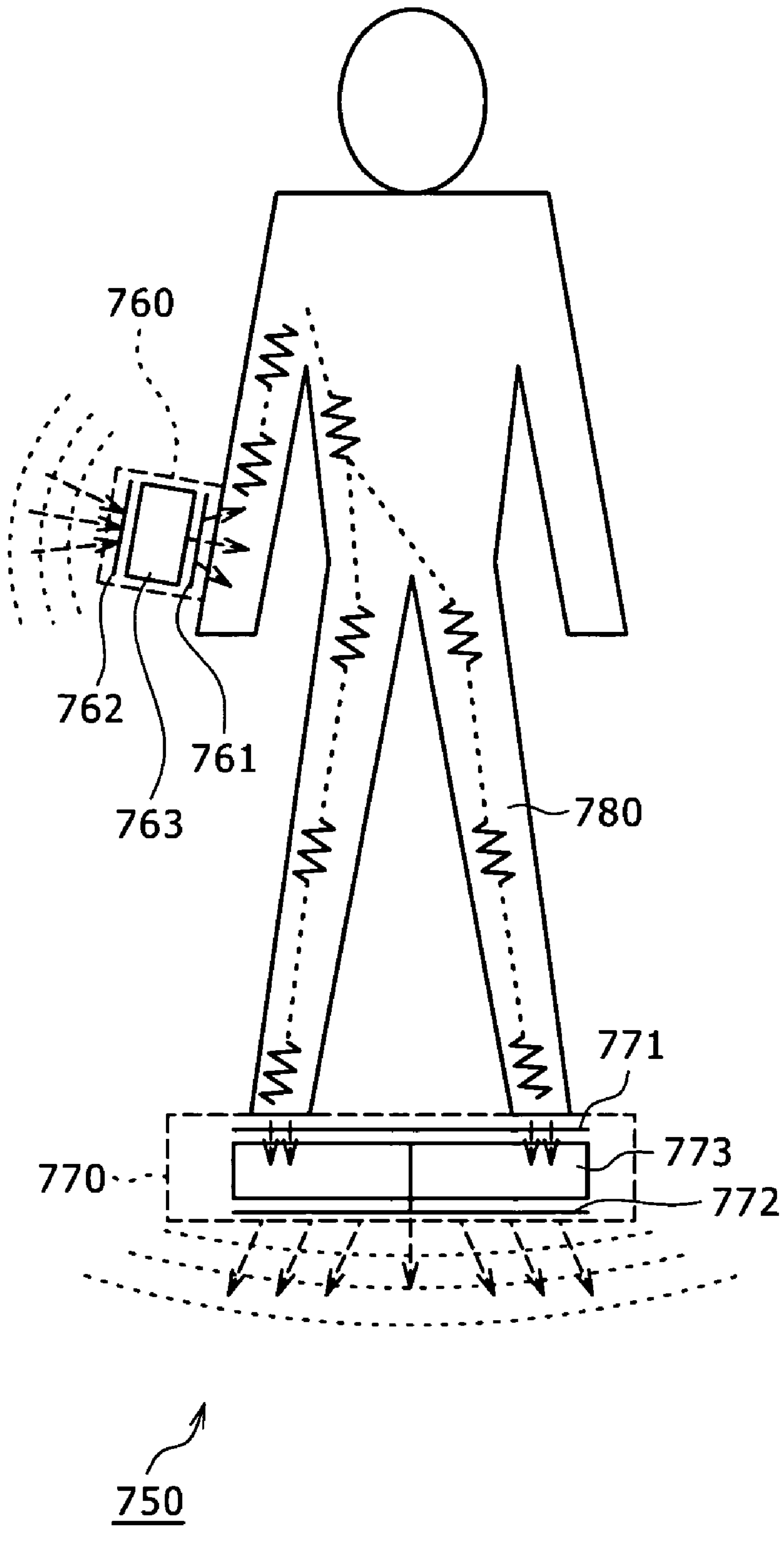
FIG. 6 is a diagram showing other actual typical utilization of the present invention to an embodiment implementing a communication system.

FIG. 6 is an explanatory diagram showing another implementation of the communication system 750. In the communication system 750 shown in FIG. 6, the reception apparatus 770 is brought into contact with the soles of the human body 780 or placed at a proximity to the soles. The reception apparatus 770 communicates with the transmission apparatus 760 attached to an arm of the human body 780. Also in this case, the transmission signal electrode 761 and the reception signal electrode 771 are provided in such a way that each electrode is brought into contact with the human body 780 which is the communication medium. The transmission reference electrode 762 and the reception reference electrode 772 are oriented in a direction toward a space. Specifically, this application example of the present invention cannot be realized in the conventional technology in which the earth is used as one of communication paths.

As described above, in accordance with the present invention, radio communication can be implemented by using a human body as a communication medium without requiring a wire facility such as a cable.

In the communication systems described above, a method for modulating a signal propagating through a communication medium is not particularly specified. That is to say, any modulation method can be adopted as long as the modulation method is compatible with both the transmission and reception apparatus. It is thus possible to select a modulation method determined to be optimum after consideration of characteristics of the entire communication system. Particularly, the modulation method can be a base band modulation technique, an amplitude modulation technique or a frequency modulation technique for an analog signal. As an alternative, the modulation method can be a base band modulation technique, an amplitude modulation technique, a frequency modulation technique or a phase modulation technique for a digital signal. As another alternative, the modulation method can be a combination of a plurality of aforementioned modulation techniques.

In addition, the communication systems described above can each have a configuration allowing a plurality of communications to be established by using one communication medium. For example, it is possible to carry out communications such as a complete duplex communication and communications among a plurality of apparatus through a single communication medium.

Typical communication methods each used for implementing the above multi communications is explained as follows. The first communication method is a method applying a spectrum spreading technique. In accordance with this method, the transmission and reception apparatus determine a common frequency bandwidth and a common specific time-axis code in advance. Then, the transmission apparatus changes the frequency of the original signal by using the time-axis code to values in the frequency bandwidth in order to spread the frequency all over the bandwidth before transmitting the signal. After the reception apparatus receives the spread components of the signal, the reception apparatus integrates the received components in order to decode the received signal.

An effect obtained as a result of the frequency spreading process is explained as follows. In accordance with a channel capacity theorem established by Shannon and Hartley, the following equation holds true:

$$C=B\times\log_2(1+S/N)\ [bps] \tag{23}$$

In the above equation, notation C denotes a channel capacity [bps], which is defined as a theoretically possible maximum data rate of data flowing through a communication path. Notation B denotes a channel bandwidth [Hz]. Notation S/N denotes a ratio of the signal power to the noise power. Such a ratio is referred to as an S/N ratio. The above equation is further subjected to Maclaurin's expansion to approximate Equation (23) given above by Equation (24) given below for small S/N ratios.

$$C\approx S/N\times B\ [bps] \tag{24}$$

Thus, for S/N ratios at levels not exceeding a noise floor, for example, the relation S/N<<1 holds true. In this case, by widening the channel bandwidth B, the channel capacity C can be raised to a desired level.

By making the time-axis code variable from communication path to communication path so that the frequency spreading movement also varies, the frequency can be spread without mutual interferences among the communication paths. Thus, since mutual crosstalks are eliminated, a plurality of communications can be carried out at the same time.

The second communication method is a method applying a frequency division technique. In accordance with this method, the transmission and reception apparatus determine a common frequency bandwidth and the common frequency bandwidth is further divided into a plurality of frequency sub-bands. In this case, the transmission apparatus (or the reception apparatus) either abides by a rule of allocating a specific frequency sub-band to a communication or detects free frequency sub-bands at the beginning of a communication and allocates one of the free frequency sub-bands to the communication on the basis of a result of detection.

That is to say, by utilizing a frequency band varying from communication path to communication path, mutual interferences can be suppressed so that a plurality of communications can be carried out at the same time through one communication medium. In addition, by adoption of the frequency division method, it is possible to carry out a many-and-one communication or a many-and-many communication.

The third communication method is a method applying a time division technique dividing a communication period between the transmission apparatus and the reception apparatus into a plurality of communication sub-periods. In this case, the transmission apparatus (or the reception apparatus) either abides by a rule of allocating a specific communication sub-period to a communication or detects free communication sub-periods at the beginning of a communication and allocates one of the free communication sub-periods to the communication on the basis of a result of detection.

That is to say, by carrying out a communication during a communication sub-period varying from communication path to communication path, a plurality of communications can be carried out at the same time through one communication medium suppressing mutual interferences. In addition, by adoption of the time division method, it is possible to carry out a many-and-one communication or a many-and-many communication.

In addition to the communication methods described above, it is possible to adopt a combination of two or more communication methods selected among the first to third communication methods.

An ability of the transmission and reception apparatus to communicate with a plurality of other apparatus at the same time is particularly important in specific applications. Let us assume for example application of the present invention to tickets of means of transportation. In this case, when a user possessing both apparatus A having information on a commutation ticket and apparatus B having an electronic money function is about to go through an automatic ticket gate, the automatic ticket gate communicates with both apparatus A and B at the same time by adoption of one of the communication methods described above. If the user is in a region outside the commutable area of the commutation ticket, for example, an amount of money can be subtracted from electric money held in apparatus B to compensate the commutation ticket for its deficiency caused by the fact that the user is in a region outside the commutable area. In this way, the present invention can be applied to an application to give the user more convenience.

Figure 7:
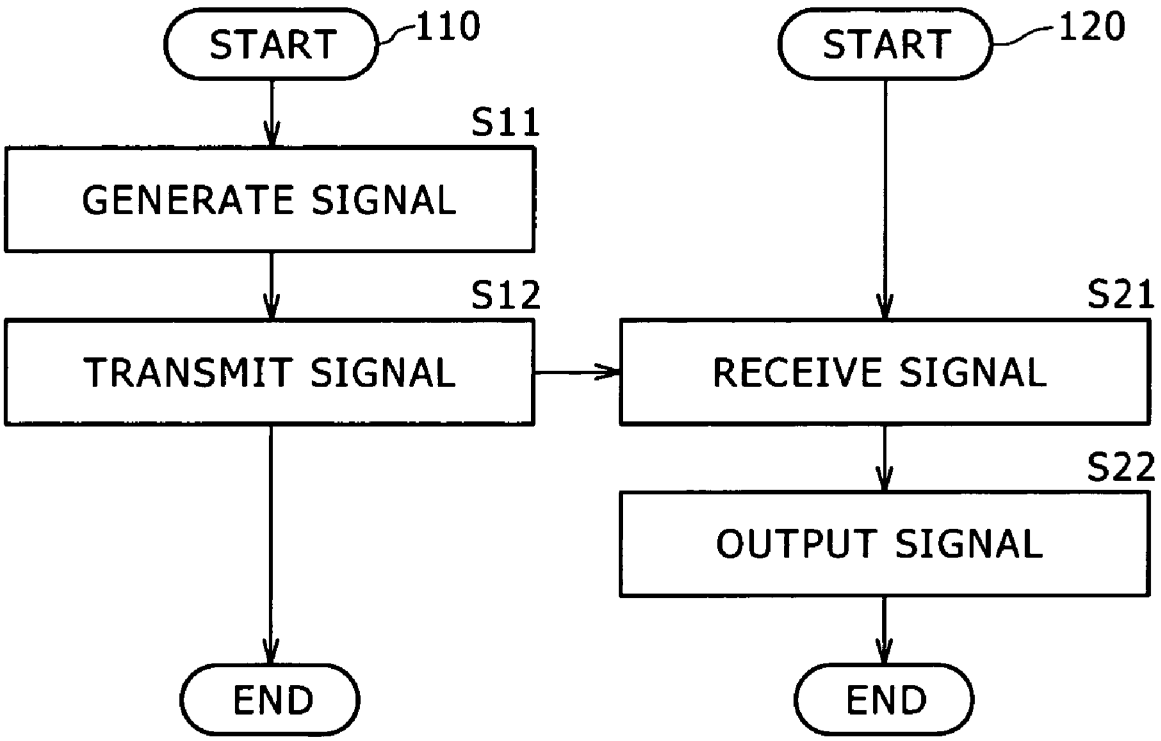
FIG. 7 shows a flowchart representing a typical flow of communication processing.

Referring to a flowchart shown in FIG. 7, the following description explains the flow of communication processing carried out during a communication between the transmission and reception apparatus described above. To be more specific, as an example, the following description explains the flow of communication processing carried out during a communication between the transmission apparatus 110 and the reception apparatus 120 in the communication system 100 shown in FIG. 1.

At a step S11, the transmission section 113 employed in the transmission apparatus 110 generates a signal to be transmitted to the reception apparatus 120. Then, in a process carried out at the next step S12, the transmission section 113 transmits the generated signal by way of the transmission signal electrode 111 and the communication medium 130. After the signal is transmitted, the transmission section 113 ends the communication processing. The signal transmitted from the transmission apparatus 110 by way of the communication medium 130 arrives at the reception apparatus 120. At a step S21, the reception section 123 employed in the reception apparatus 120 receives the signal by way of the reception signal electrode 121. Then, in a process carried out at the next step S22, the reception section 123 outputs the received signal. After outputting the received signal, the reception section 123 ends the communication processing.

As described above, the transmission apparatus 110 and the reception apparatus 120 are capable of carrying out a basic communication through the communication medium 130 by performing simple processing requiring no complicated processes. That is to say, since it is not necessary to construct a closed circuit by using reference electrodes, by merely exchanging a signal by way of signal electrodes, the transmission apparatus 110 and the reception apparatus 120 are capable of carrying out stable communication processing with ease without being affected by the environment. Thus, the communication system 100 including the transmission apparatus 110 and the reception apparatus 120 allows the load of the stable communication processing unaffected by the environment to be reduced and the manufacturing cost to be decreased. In addition, since the structure of the communication processing can be made simple, the communication system 100 is capable of easily adopting a multi-type communication method including modulation, coding, encryption and multiplexing techniques.

The configuration of any of the communication systems described above includes a transmission apparatus physically separated from a reception apparatus. It is to be noted, however, that the scope of the present invention is not limited to such a configuration. For example, the communication system can also have a configuration including a transmission/reception apparatus having the functions of both a transmission apparatus and a reception apparatus.

Figure 8:
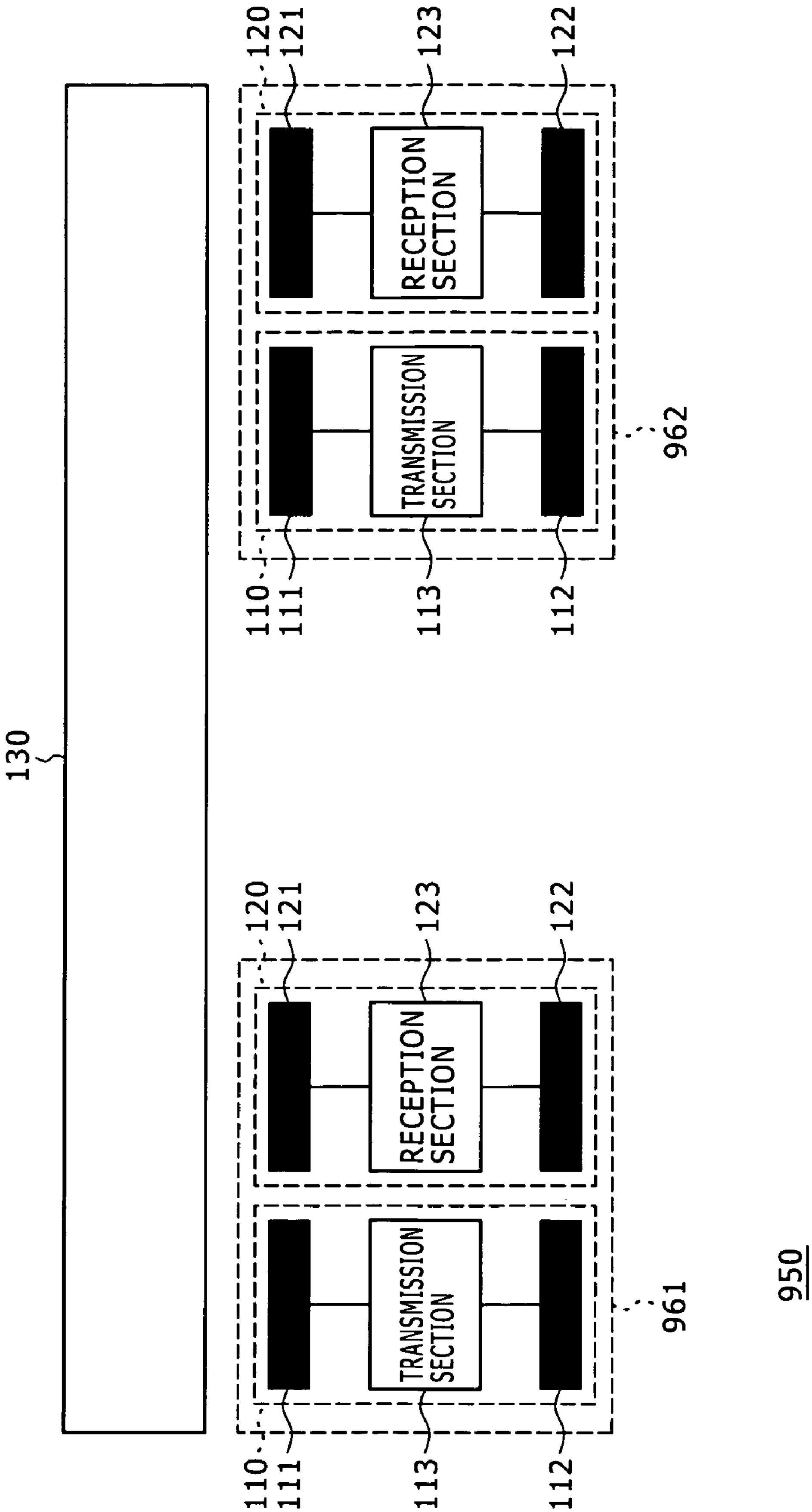
FIG. 8 is a diagram showing a typical configuration of another communication system to which the present invention is applied.

FIG. 8 is a diagram showing a typical configuration of a communication system to which the present invention is applied.

As shown in FIG. 8, the communication system 950 includes a transmission/reception apparatus 961, a transmission/reception apparatus 962 and a communication medium 130. The communication system 950 is a system in which signals are exchanged between the transmission/reception apparatus 961 and the transmission/reception apparatus 962 in both directions by way of the communication medium 130.

The transmission/reception apparatus 961 has a configuration including a transmission section 110 identical with the transmission apparatus 110 employed in the communication system 100 shown in FIG. 1 and a reception section 120 identical with the reception apparatus 120 employed in the communication system 100 shown in FIG. 1. That is to say, the transmission/reception apparatus 961 includes a transmission signal electrode 111, a transmission reference electrode 112, a transmission section 113, a reception signal electrode 121, a reception reference electrode 122 and a reception section 123.

The transmission/reception apparatus 961 transmits a signal from the transmission apparatus 110 by way of the communication medium 130 and receives another signal in the reception apparatus 120 from the transmission/reception apparatus 962, which transmits the other signal by way of the communication medium 130. The transmission/reception apparatus 961 has a configuration capable of preventing communications carried out by the transmission apparatus 110 and the reception apparatus 120 from interfering each other.

The transmission/reception apparatus 962 has a configuration similar to the configuration of the transmission/reception apparatus 961 and operates in the same way as the transmission/reception apparatus 961. For this reason, the transmission/reception apparatus 962 is not explained in particular. The transmission/reception apparatus 961 and the transmission/reception apparatus 962 carry out communications in both directions through the communication medium 130 by adoption of the same method.

In this way, the communication system 950 including the transmission/reception apparatus 961 and the transmission/reception apparatus 962 is capable of implementing radio communications in both directions with ease without requiring a wire facility such as a cable.

In the typical configuration shown in FIG. 8, the transmission electrodes are provided separately from the reception electrodes. It is to be noted, however, that it is possible to employ only a pair of signal and reference electrodes common to transmissions and receptions. In this case, the pair of signal and reference electrodes is switched from a transmission to a reception and vice versa.

The following description explains a financial transaction system utilizing the radio communications explained earlier by referring to FIGS. 1 to 8. FIG. 9 is a block diagram showing a typical configuration of the financial transaction system 1000 to which the present invention is applied.

In the configuration shown in the figure, an ATM (automated teller machine) 1001 of a bank accepts an operation input entered by a user 1002 and carries out transactions, such as a deposit, a withdrawal and a payment according to the input. When the user 1002 operates a operation panel 1001*a* of the ATM 1001 by, for example, pressing a predetermined button, the ATM 1001 generates information such as a command according to the content of the operation carried out by the user and transmits the information to a server 1021 installed at a data center 1004 of the bank through a communication line or the like.

In addition, the ATM 1001 also receives input information on the organism of the user 1002. The information on the organism is information on a living organ, such as a fingerprint, a retina, an iris or a vein. To be more specific, the information on a living organ is a characteristic quantity such as the shape of the living organ. For example, when the user 1002 brings the palm into contact with a predetermined area of the operation panel 1001*a*, the characteristic quantity representing the shape of a vein in the palm of the hand is input to the ATM 1001 as information on an organism. For every user making a contract with the bank, information on the organism of the user is stored in advance in the server 1021. The ATM 1001 verifies that the user is the true user on the basis of a result of determination as to whether or not the information on the organism of the user 1002 matches the organism information stored in advance.

The user 1002 also carries a portable device 1003 attached to typically the body of the user 1002 or a portion of clothes. The portable device 1003 carries out the communication described earlier by referring to FIGS. 1 to 8 with the ATM 1001 through a communication medium, which is typically the body of the user 1002 in this case. In the communication, the portable device 1003 transmits information such as an ID to the ATM 1001. Before the ATM 1001 carries out a transaction based on an operation performed by the user 1002, the ATM 1001 checks the state of a communication with the portable device 1003 for the transaction in each case. The ATM 1001 carries out the transaction only if the communication with the portable device 1003 is sustainable.

The server 1021 installed at the data center 1004 is typically a mainframe computer having a high processing ability. A database stored in a storage section of the server 1021 contains account information and organism information for every user making a contract with the bank. Examples of the account information of a user are the name, the balance and a personal identification number or password. In accordance with a command received from the ATM 1001, the server 1021 determines whether or not organism information input from the user 1002 to the ATM 1001 matches organism information stored in advance in the database and carries out a transaction to subtract a specified amount of money from the balance included in the account information. In addition, the account information stored for each account in the database of the server 1021 includes information on a transaction history, which is updated every time a transaction such as depositing, a withdrawal or a payment is carried out.

The user 1002 is also capable of making an access to the server 1021 by using typically a personal computer 1006 installed at the home of the user 1002. This is because the personal computer 1006 is connected to the server 1021 by a network such as the Internet 1005. Thus, by entering secret information such as an ID assigned by the bank in advance to the user 1002 or a password, the user 1002 is capable of making a login to the server 1021. In this way, the user 1002 is capable of carrying out transactions such as Internet banking or advance setting.

An example of the advance setting is an operation to set a permission to carry out a transaction involving money exceeding a predetermined upper limit of the amount of money handled in each transaction performed by using the ATM 1001. To be more specific, as a rule, a transaction involving money exceeding the upper limit is normally prohibited. However, the user 1002 is allowed to carry out a transaction such as a payment or withdrawal exceeding the upper limit only if the user 1002 enters a predetermined number registered in advance by the user 1002 in the server 1021. The predetermined number registered in advance is referred to as a cataloged setting number.

Figure 10:
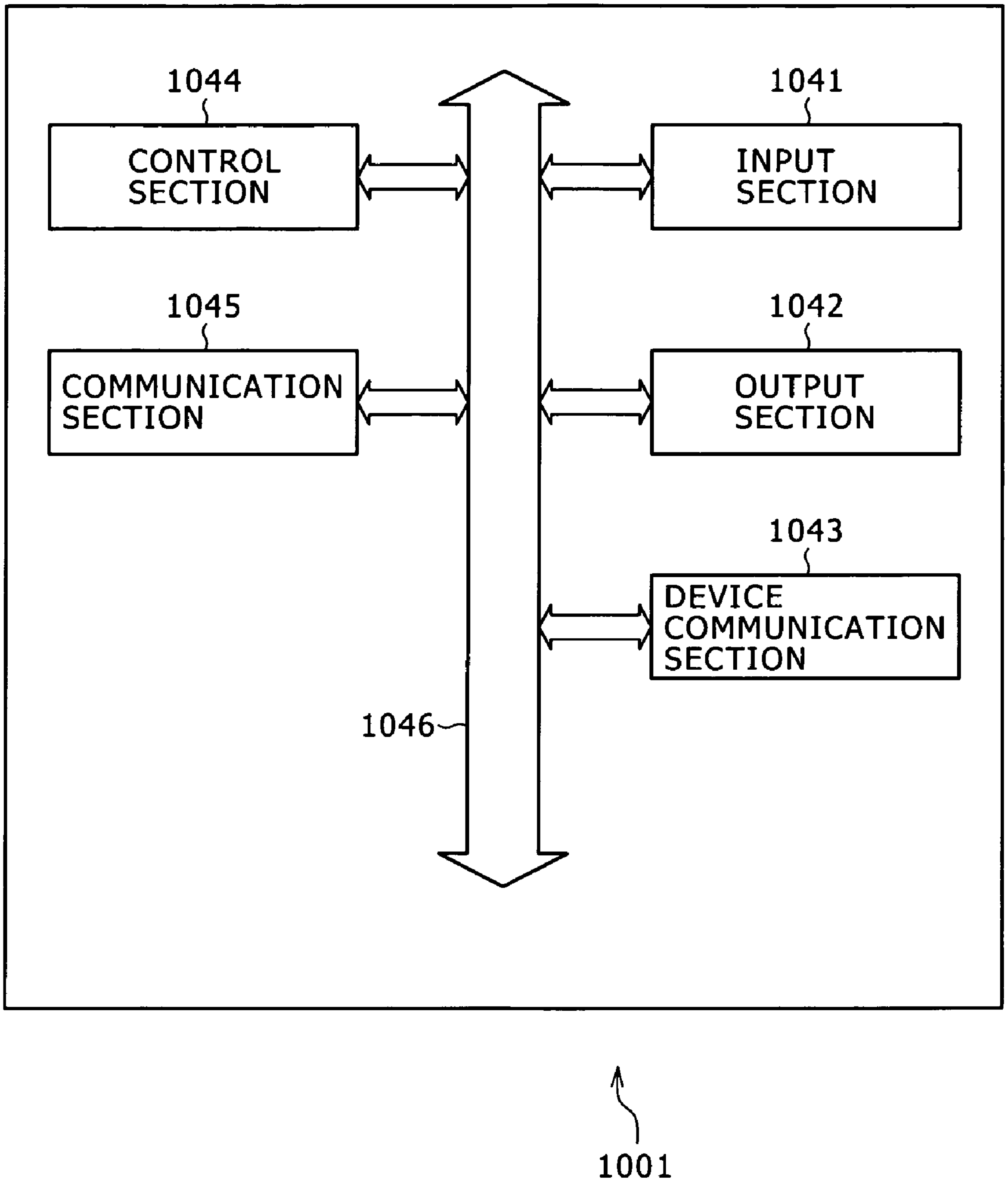
FIG. 10 is a diagram showing a typical internal configuration of an ATM employed in the financial transaction system shown in FIG. 9.

FIG. 10 is a block diagram showing a typical internal configuration of the ATM 1001. In the configuration shown in the figure, an input section 1041 receives an operation input from the operation panel 1001*a* and issues a command according to the substance of the operation input to a bus 1046.

An output section 1042 is connected to a display section such as an LCD (Liquid Crystal Display) or an audio output section such as a speaker included in the operation panel 1001*a*. In accordance with control executed by a control section 1044, the output section 1042 controls an operation to display a picture on the display section or an operation to generate a sound in the audio output section. In addition, the output section 1042 is also connected to an external interface. Thus, the output section 1042 is also capable of controlling operations carried out by sections connected to the external interface, such as a cash input/output section or a passbook record updating section.

A device communication section 1043 is a section for carrying out processing of a radio communication with the portable device 1003 through a human body serving as a communication medium. In a radio communication between the ATM 1001 and the portable device 1003, the device communication section 1043 and the portable device 1003 form a communication system similar to the communication system 950 shown in FIG. 8. Typically, the device communication section 1043 corresponds to the transmission/reception apparatus 961 in FIG. 8 whereas the portable device 1003 corresponds to the transmission/reception apparatus 962 in FIG. 8. It is to be noted that a detailed configuration of the device communication section 1043 will be described later.

The control section 1044 is composed of a CPU (Central Processing Unit), a ROM (Read Only Memory) and a RAM (Random Access Memory) and the like to control other sections employed in the ATM 1001.

The communication section 1045 is composed of components, for example, a network interface card or the like to control communications with the server 1021 through a communication line.

The blocks composing the ATM 1001 as described above are connected to each other by the bus 1046.

Figure 11:
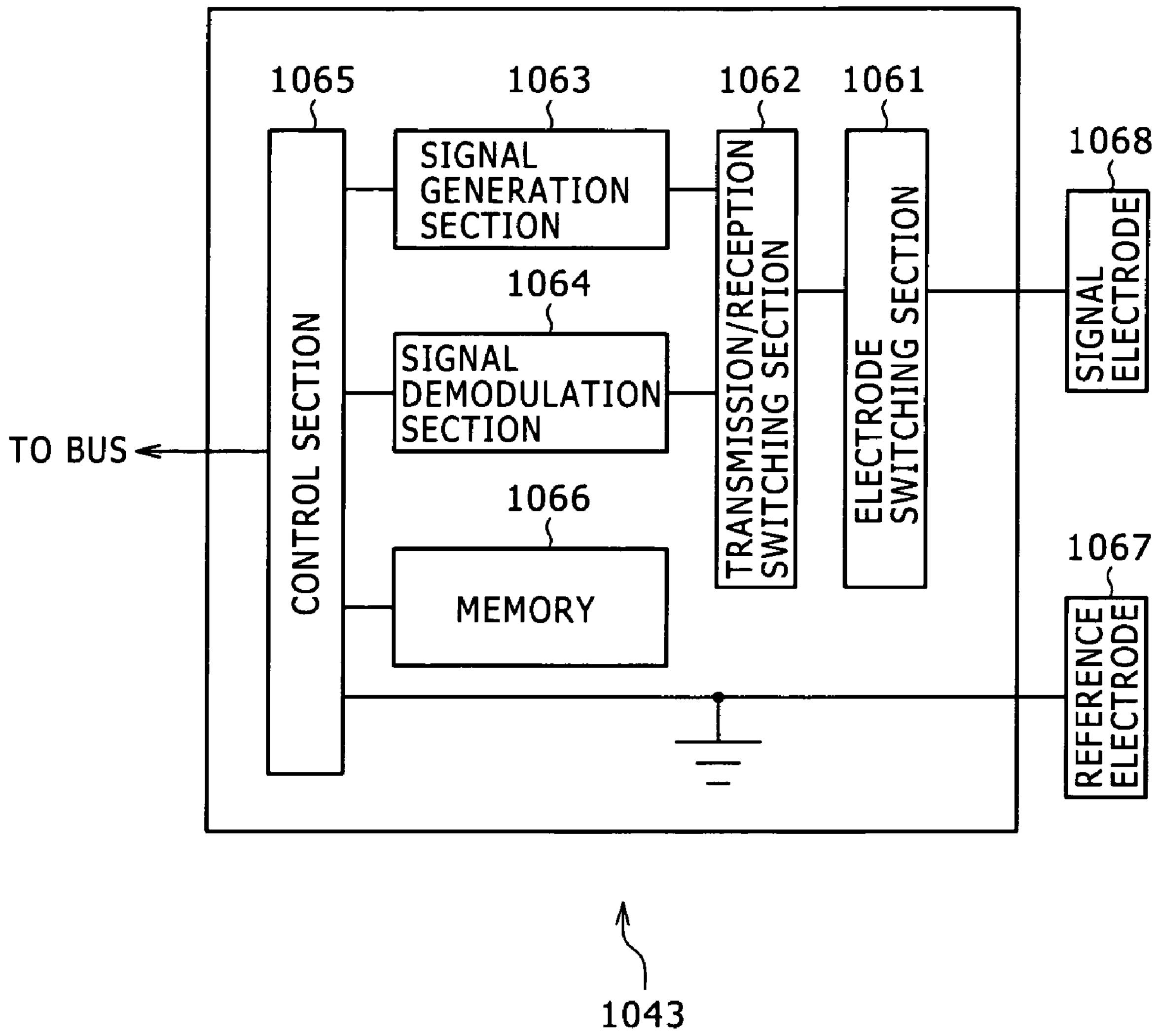
FIG. 11 is a block diagram showing a detailed typical configuration of a device communication section employed in the ATM shown in FIG. 10.

FIG. 11 is a block diagram showing a detailed typical configuration of the device communication section 1043. In general, the configuration shown in the figure includes a plurality of signal electrodes 1068. In such a configuration, an electrode switching section 1061 switches the path from one of signal electrodes 1068 to another. For example, the electrode switching section 1061 switches ON/OFF the path sequentially from one signal electrode 1068 to another in a predetermined order.

A transmission/reception switching section 1062 is a section for selectively connecting the electrode switching section 1061 to either a signal generation section 1063 or a signal demodulation section 1064 in accordance with control executed by a control section 1065.

The signal generation section 1063 is a section for generating a signal representing information to be transmitted to the portable device 1003 in accordance with control executed by the control section 1065 in an operation to transmit the information to the portable device 1003. On the other hand, the signal demodulation section 1064 is a section for demodulating a signal received from the portable device 1003 as a signal representing information in an operation to receive the signal from the portable device 1003 and supplying the demodulated signal to the control section 1065.

The control section 1065 is a section for controlling other sections employed in the device communication section 1043. For example, the control section 1065 controls the operation carried out by the signal generation section 1063 to generate a signal representing data to be transmitted to the portable device 1003, or controls the operation carried out by the signal demodulation section 1064 to demodulate a signal received from the portable device 1003 and, if necessary, stores data obtained as a result of a process carried out by the signal demodulation section 1064 to demodulate the signal in the memory 1066.

The memory 1066 is typically an EEPROM (Electrically Erasable Programmable Read Only Memory) used for storing various kinds of data in accordance with control executed by the control section 1065.

A reference electrode 1067 and the signal electrode 1068 are respectively the reference and signal electrodes used in radio communications described earlier by referring to FIGS. 1 to 8. The signal electrode 1068 is provided at a proximity to a communication medium such as a human body. In the case of the ATM 1001, the signal electrode 1068 is included in the operation panel 1001*a* to be touched by a hand of the user 1002. On the other hand, the reference electrode 1067 is provided by being oriented in a direction toward a space. For example, the reference electrode 1067 corresponds to the transmission reference electrode 112 or reception reference electrode 122 in FIG. 8 whereas the signal electrode 1068 corresponds to the transmission signal electrode 111 or reception signal electrode 121 in FIG. 8.

Figure 12:
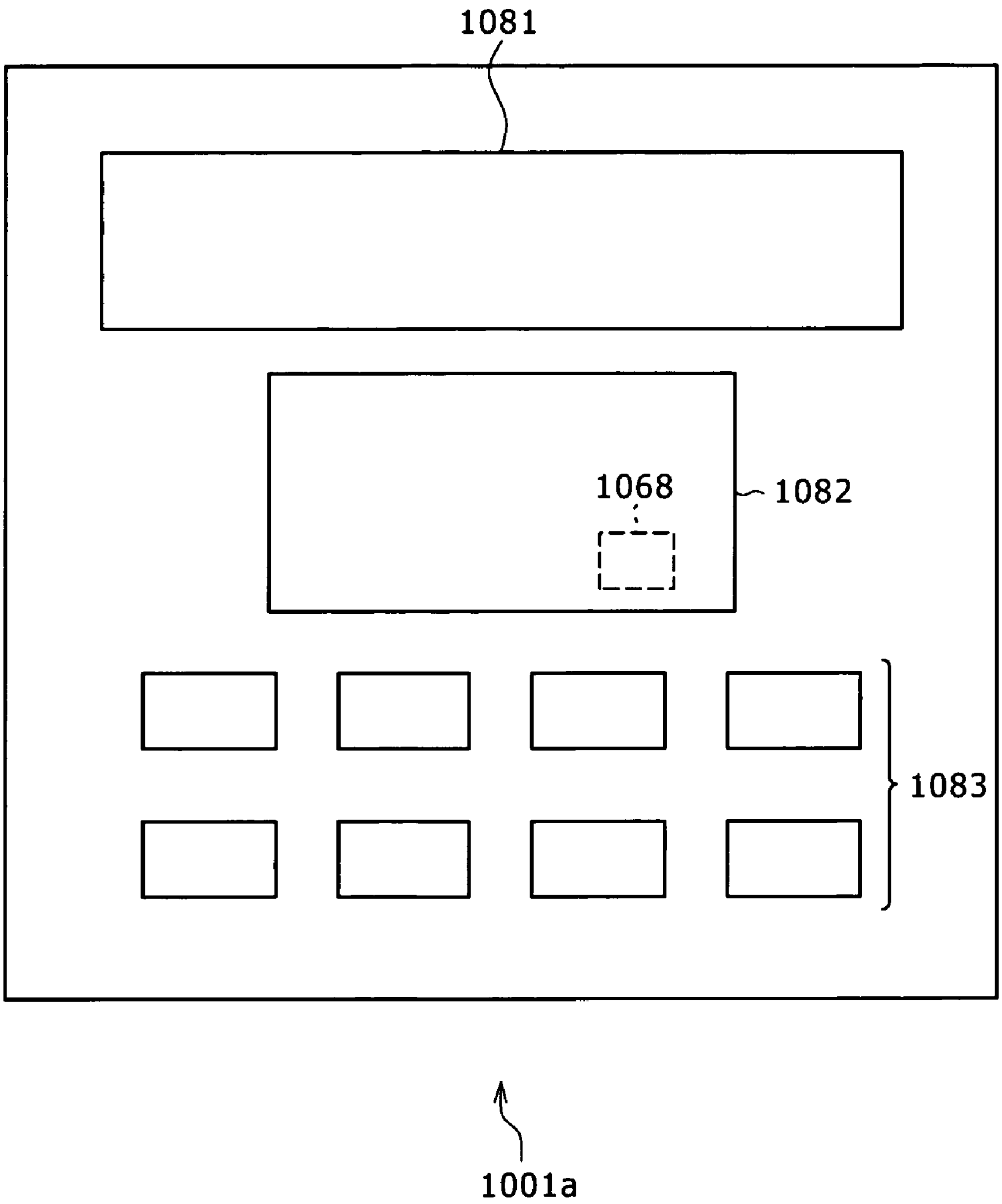
FIG. 12 is a block diagram showing a typical configuration of an operation panel employed in the ATM shown in FIG. 10.

FIG. 12 is a block diagram showing a typical configuration of the operation panel 1001*a*. A display section 1081 included in the configuration shown in the figure is typically an LCD (Liquid Crystal Display) for displaying information such as a command of an operation input in accordance with a signal received from the output section 1042.

A contact section 1082 is functional block for receiving entered information on an organism. For example, when the user 1002 brings the palm into contact with the contact section 1082, the shape of a vein in the palm of the hand is detected by an image sensor and a characteristic quantity representing the detected shape of the vein is computed. Then, the computed characteristic quantity is supplied to the input section 1041 as information on an organism. In addition, the contact section 1082 includes an embedded signal electrode 1068. In this configuration, when the user 1002 brings the palm into contact with the contact section 1082, a radio communication is carried out between the portable device 1003 and the device communication section 1043 through a communication medium, which is the body of the user 1002 in this case.

Operation buttons 1083 are each a button to be pressed to specify a transaction type or an amount of money. In addition, each of the operation buttons 1083 may include an embedded signal electrode 1068. In this case, when the user 1002 presses any of the operation buttons 1083, a radio communication is carried out between the portable device 1003 and the device communication section 1043.

Figure 13:
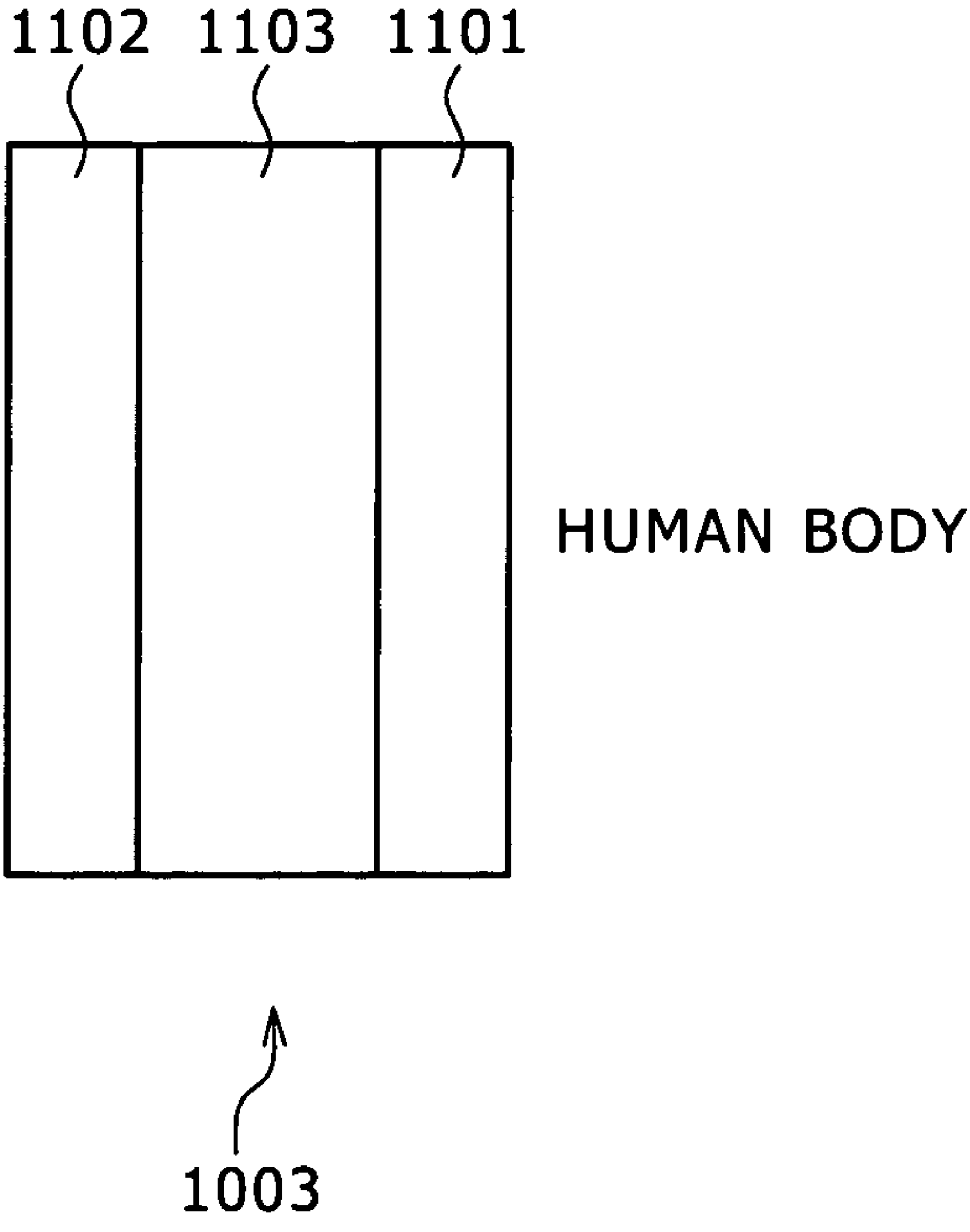
FIG. 13 is a diagram showing a typical configuration of a portable device employed in the financial transaction system shown in FIG. 9.

FIG. 13 is a diagram showing a typical configuration of the portable device 1003. The portable device 1003 has a configuration with a small size allowing the portable device 1003 to be portable enough. As described above, the portable device 1003 is a device for carrying out a radio communication with the device communication section 1043 employed in the ATM 1001. The portable device 1003 includes a signal electrode 1101, a reference electrode 1102 and a control section 1103. The signal electrode 1101 is provided at a proximity to a human body serving as a communication medium. The reference electrode 1102 is oriented in a direction toward a space.

For example, the reference electrode 1102 corresponds to the transmission reference electrode 112 or reception reference electrode 122 in FIG. 8 whereas the signal electrode 1101 corresponds to the transmission signal electrode 111 or reception signal electrode 121 in FIG. 8.

The control section 1103 employed in the portable device 1003 is typically a computer having a small size. The control section 1103 has functions of the sections ranging from the transmission/reception switching section 1062 to the control section 1065 as described above. The functions are implemented by hardware serving as physical means and software serving as logical means. In addition, the control section 1103 also has a storage section used for storing information. The storage section is typically an EEPROM (Electrically Erasable Programmable Read Only Memory). Information stored in the storage section includes a unique ID assigned to the portable device 1003 to be used for identifying the portable device 1003 and the cataloged setting number issued as a result of the advance setting described earlier.

The control section 1065 employed in the device communication section 1043 shown in FIG. 11 has a predetermined interface for connecting the device communication section 1043 to an external information apparatus such as a personal computer so that the device communication section 1043 is capable of communicating with the external information apparatus through the interface, such as a USB (universal serial bus) interface if necessary.

The portable device 1003 may be carried by being mounted on a wrist of the user 1002 typically in the same way as a wrist watch or put in a case attached to a belt as a case with a sufficiently small size. As an alternative, the portable device 1003 can be designed as a portion of a compact electronic device such as a hand phone. In this way, the user 1002 can always carry the portable device 1003.

Figure 14:
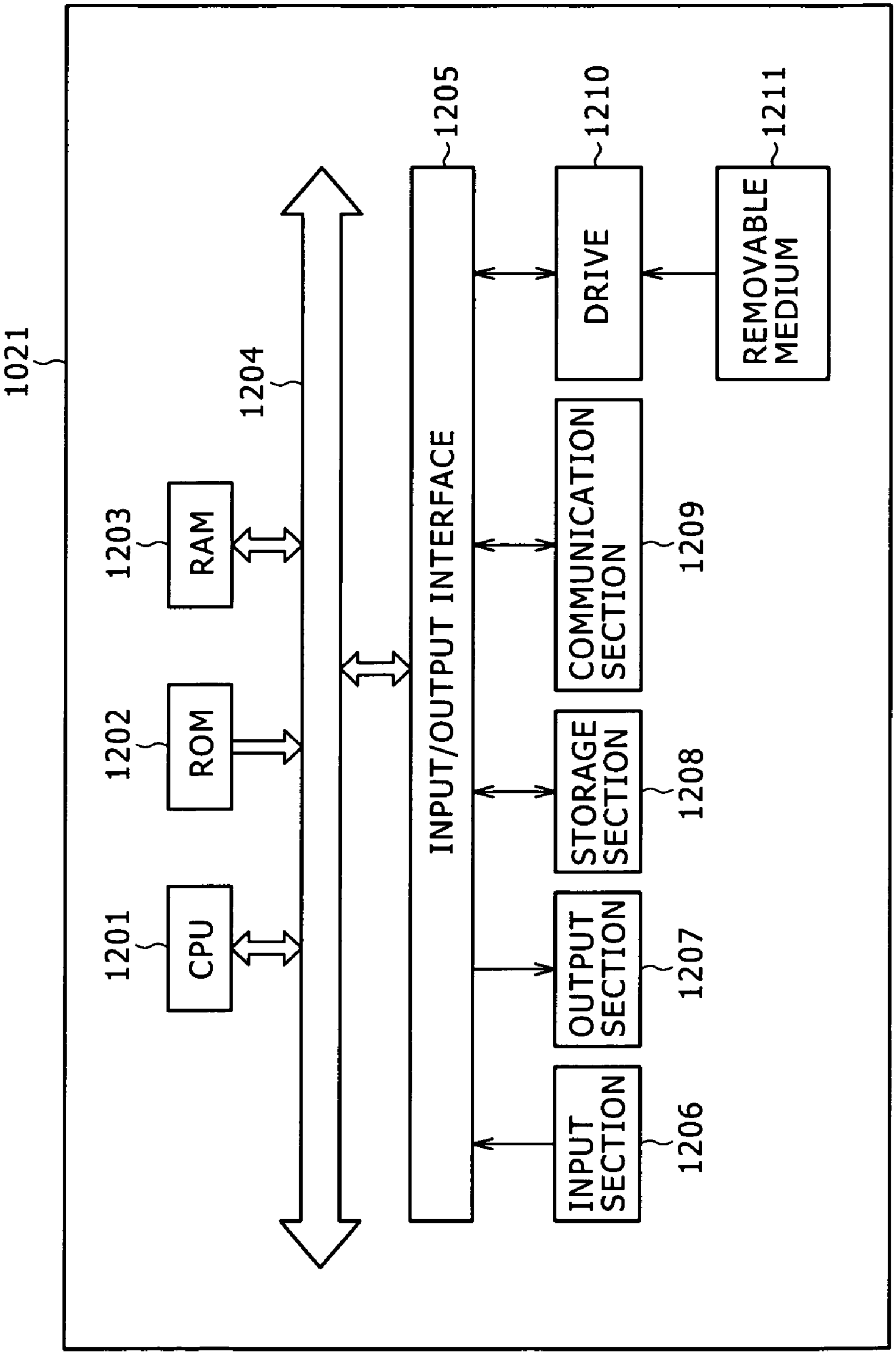
FIG. 14 is a block diagram showing a typical internal configuration of a server employed in the financial transaction system shown in FIG. 9.

FIG. 14 is a block diagram showing a typical internal configuration of the server 1021 in FIG. 9. In the configuration shown in the figure, a CPU (Central Processing Unit) 1201 is a component for carrying out various kinds of processing by execution of programs stored in advance in a ROM (Read Only Memory) 1202 or programs loaded into a RAM (Random Access Memory) 1203 from a storage section 1208. The RAM 1203 is also used for properly storing information such as data required by the CPU 1201 in executing the various kinds of processing.

The storage section 1208 is typically an HDD (Hard Disk Drive), which is also used for storing information on accounts of users each making a contract with the bank and information on organisms of such users.

The CPU 1201, the ROM 1202 and the RAM 1203 are connected to each other by a bus 1204. The bus 1204 is also connected to an input/output interface 1205.

The input/output interface 1205 is connected to an input section 1206, an output section 1207, the storage section 1208 mentioned above and a communication section 1209. The input section 1206 includes a keyboard and a mouse whereas the output section 1207 includes a display unit having a CRT (Cathode Ray Tube) or an LCD (Liquid Crystal Display) and a speaker. The storage section 1208 includes a hard disk. The communication section 1209 has a modem or a network interface card such as a LAN card. The communication section 1209 is a unit for carrying out communication processing with other apparatus through a network such as the Internet.

If necessary, the input/output interface 1205 is also connected to a drive 1210 on which a removable recording medium 1211 is mounted. The removable recording medium 1211 can be a magnetic disk, an optical disk, a magneto-optical disk or a semiconductor memory. As described above, a computer program to be executed by the CPU 1201 is installed in advance in the storage section 1208 from the removable recording medium 1211 to be eventually loaded into the storage section 1208.

It is to be noted that a plurality of computers described above by referring to the figure can also be connected to each other to implement functions of the server 1021. As another alternative, a computer can also be provided separately as a computer for managing a large-size database used for storing information on accounts of users each making a contract with the bank and information on organisms of such users.

The personal computer 1006 employed in the financial transaction system 1000 shown in FIG. 9 has the same configuration as that explained above by referring to FIG. 14. For this reason, FIG. 14 can be referred to if necessary in explaining operations carried out by the personal computer 1006.

Figure 15:
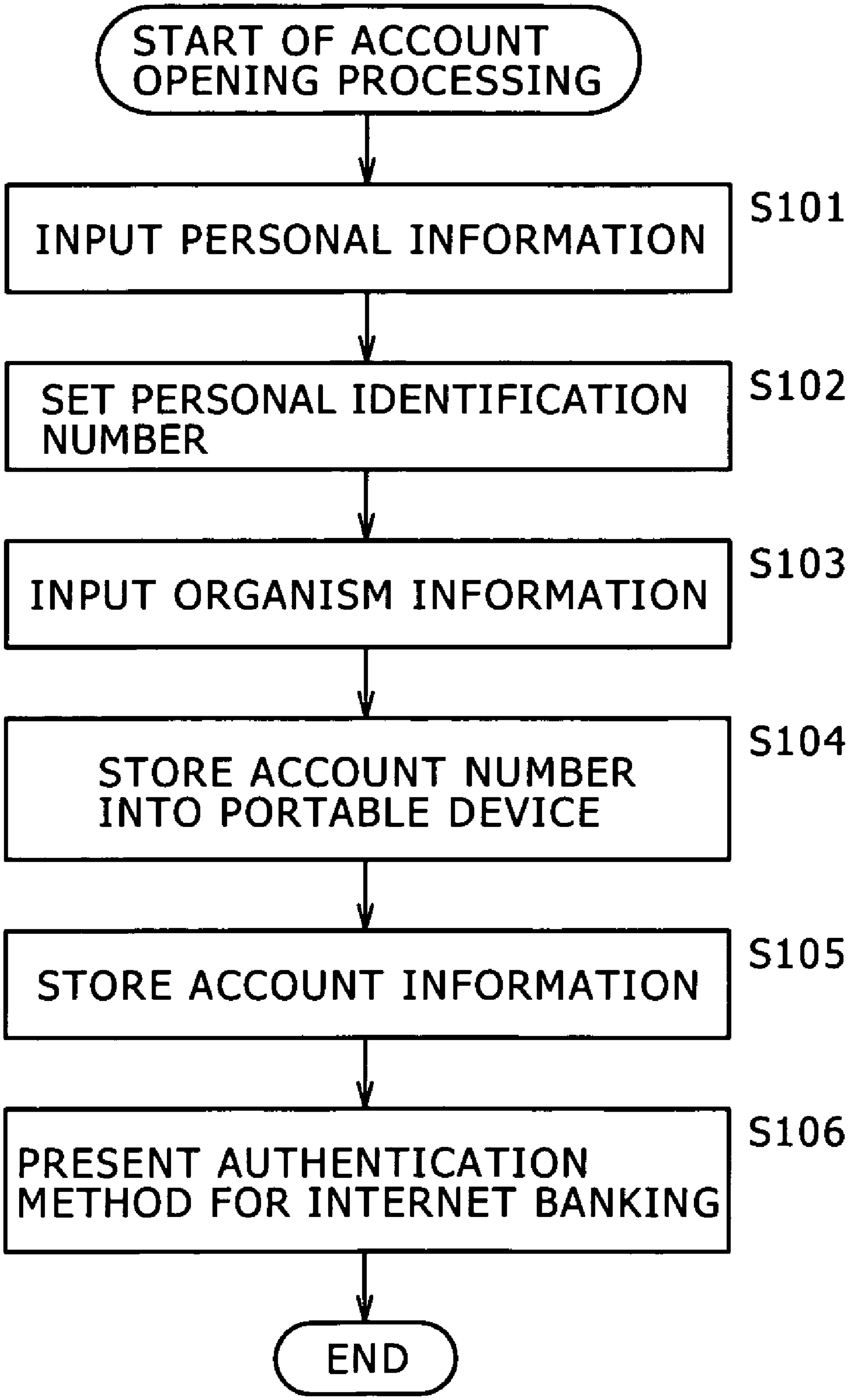
FIG. 15 shows a flowchart referred to in explanation of typical processing to open an account.

By referring to a flowchart shown in FIG. 15, the following description explains account opening processing carried out by the server 1021 to open an account for the user 1002 in a bank. In the account opening processing, typically, a bank teller dealing face-to-face with the user 1002 makes an access to the server 1021 by operating an apparatus such as a terminal not shown in the figure.

The flowchart shown in the figure begins with a step S101, at which the server 1021 accepts input personal information and an ID assigned to the portable device 1003. The personal information typically includes the name, address, telephone number and mail address of the user 1002. It is to be noted that the ID of the portable device 1003 may also be read out automatically from the portable device 1003.

Then, at the step S102, the server 1021 sets a personal identification number. An example of the personal identification number is any arbitrary number selected by the user 1002 as a number consisting of a predetermined number of digits. In order to keep the personal identification number confidential, the personal identification number is input from the user 1002 in an encrypted form and transmitted to the server 1021.

Then, in a process carried out at the next step S103, the server 1021 accepts input information on an organism. In this process, typically, the user 1002 brings the palm into contact with a predetermined area of the terminal operated by the teller of the bank. Then, the shape of a vein in the palm of the hand of the user 1002 is detected by an image sensor and a characteristic quantity representing the detected shape of the vein is computed. Subsequently, the computed characteristic quantity is transmitted to the server 1021 as information on an organism.

Then, in a process carried out at the next step S104, the server 1021 issues an account number to the user 1002 and the account number is recorded in the portable device 1003. To put it in detail, typically, the server 1021 transmits the issued account number to the terminal operated by the teller of the bank. The terminal then supplies the account number to the portable device 1003 through a predetermined interface. Finally, the account number is stored in a storage section employed in the portable device 1003 as a memory.

Then, in a process carried out at the next step S105, the server 1021 stores the account number issued at the step S104 in a database of the storage section 1208 as information on an account by associating the account number with the personal information received at the step S101 as the personal information of the user 1002, the personal identification number set at the step S102 as the personal identification number of the user 1002 and the organism information received at the step S103 as the organism information of the user 1002.

In this way, the server 1021 generates information on an account and catalogs the information in the database. At the same time, the server 1021 also stores information associated with the portable device 1003.

Then, in a process carried out at the next step S106, the server 1021 presents an authentication method for Internet banking. The authentication method for Internet banking is an authentication method required in order for the user 1002 to utilize an Internet banking service such as a payment transaction by operating the personal computer 1006. When the user 1002 wants to utilize an Internet banking service, the user 1002 is authenticated on the basis of typically an entered password different from the personal identification number. Thus, in a process carried out at the step S106, typically, a password is set and added to the information on the account. Then, the password is presented to the user 1002.

FIG. 16 is a diagram showing typical account information cataloged in the database stored in the storage section 1208 employed in the server 1021. As shown in the figure, the typical information on an account includes an account number, a name, a device ID (or the ID of the portable device 1003), an address, a phone number, a mail address, Internet banking authentication information, a catalog set number to be described later, a personal identification number and organism authentication information. It is to be noted that the organism authentication information can also be stored separately from the information on an account. Such information on an account is stored in the database of the server 1021 for each account number. It is also worth noting that, every time a transaction such as depositing, a withdrawal or a payment is carried out for the account, a history of transactions is updated and stored by associating the history with the account number. Normally, the history of transactions also shows the type of transaction and the amount of money involved for every transaction.

FIG. 17 is a diagram showing typical information stored in a storage section employed in the portable device 1003. As shown in the figure, the typical information includes a device ID, which is an ID assigned to the portable device 1003, a bank number/a branch number, an account number and a cataloged setting number to be described later. This typical information shows that the user 1002 opens accounts at a plurality of banks or a plurality of branches. In a process carried out at the step S104, bank/branch numbers are stored in the storage section along with an account number opened at the bank or the branch.

In this way, an account is opened for the user 1002.

By referring to a flowchart shown in FIG. 18, the following description explains transaction processing 1, which is processing based on an account opened by the user 1002. This processing is carried out, for example, when the user 1002 having the portable device 1003 attached to the body thereof operates the ATM 1001 to enter a command starting a transaction.

The flowchart shown in the figure begins with a step S201, at which the control section 1044 employed in the ATM 1001 produces a result of determination as to whether or not the device communication section 1043 of the ATM 1001 has been capable of communicating with the portable device 1003. At this step, the ATM 1001 enters a state of waiting for a result of determination to reveal that the device communication section 1043 has been capable of communicating with the portable device 1003. For example, when the user 1002 brings the palm into contact with the contact section 1082, a radio communication is carried out between the portable device 1003 and the device communication section 1043 through a communication medium, which is the body of the user 1002 in this case. In this case, the result of the determination reveals that the device communication section 1043 has been capable of communicating with the portable device 1003.

As the determination result produced in a process carried out at the step S201 reveals that the device communication section 1043 has been capable of communicating with the portable device 1003, the flow of the processing goes on to a step S202 at which the control section 1044 controls the device communication section 1043 to acquire an ID and an account number from the portable device 1003. In accordance with the control executed by the control section 1044, the device communication section 1043 transmits a request to the portable device 1003 as a request for transmission of such information. Receiving the request, the portable device 1003 transmits the ID (that is, the device ID) and account number stored in the storage section employed in the portable device 1003 to the device communication section 1043.

Figure 19:
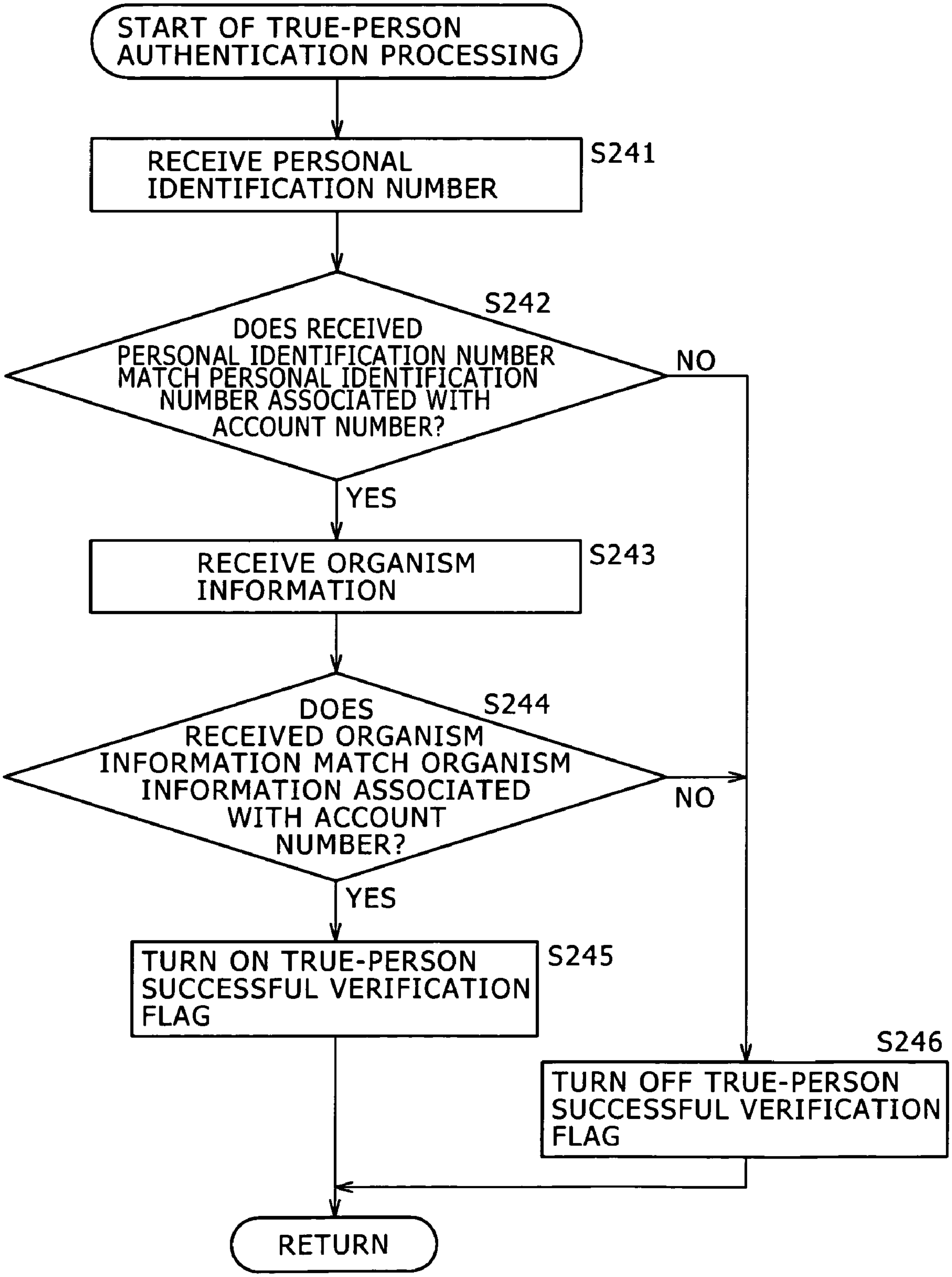
FIG. 19 shows a flowchart referred to in explanation of typical processing to verify that a user is the true person.

Then, at the next step S203, the control section 1044 carries out processing to verify that the user 1002 is the true person. By carrying out the processing to verify that the user 1002 is the true person, the user 1002 can be verified the identity as the true person who has opened an account. Details of the processing carried out at the step S203 to verify the identity of the user 1002 are explained by referring to a flowchart shown in FIG. 19.

The flowchart shown in the figure begins with a step S241, at which the control section 1044 receives a personal identification number entered by the user 1002. Typically, the control section 1044 requests the user 1002 to enter a personal identification number by displaying a message on the display section 1081 as a message prompting the user 1002 to enter the personal identification number. In response to the message, the user 1002 operates the buttons 1083 in order to enter the personal identification number.

Then, in a process carried out at the next step S242, the control section 1044 determines whether or not the personal identification number received at the step S241 matches a personal identification number associated with the account number. At this step, for example, the ATM 1001 transmits the account number received at the step S202 of the flowchart shown in FIG. 18 and the personal identification number received at the step S241 to the server 1021, which then searches for account information associated with the account number. Then, the server 1021 determines whether or not the personal identification number received at the step S241 matches the personal identification number associated with the account number and transmits the result of the determination to the ATM 1001.

If the determination result produced in a process carried out at the step S242 reveals that the personal identification number received in a process carried out at the step S241 matches the personal identification number associated with the account number, the flow of the processing goes on to a step S243 at which the control section 1044 receives entered organism information. In order to obtain the organism information, for example, the control section 1044 displays a message on the display section 1081 as a message prompting the user 1002 to accurately bring the palm of its hand into contact with the contact section 1082. In response to the message, the user 1002 accurately brings the palm into contact with the contact section 1082. At that time, the shape of a vein in the palm of the hand of the user 1002 is detected by an image sensor and a characteristic quantity representing the detected shape of the vein is computed. Subsequently, the computed characteristic quantity is input as the organism information.

Then, in a process carried out at the next step S244, the control section 1044 determines whether or not the organism information received at the step S243 matches organism information associated with the account number. At this step, for example, the ATM 1001 transmits the account number received in a process carried out at the step S202 of the flowchart shown in FIG. 18 and the organism information received at the step S243 to the server 1021, which then searches for account information associated with the account number. The account information associated with the account number includes organism information associated with the account number. Then, the server 1021 determines whether or not the organism information received at the step S243 matches the organism information associated with the account number and transmits the result of the determination to the ATM 1001.

It is to be noted that, in actuality, the process carried out at the step S244 is not a process to determine whether or not the organism information received at the step S243 accurately matches the organism information associated with the account number. Instead, a result of determination is produced on the basis of whether the organism information received at the step S243 matches organism information associated with the account number to a high or low degree of matching. For example, a characteristic quantity representing typically the detected shape of the vein is transmitted as organism information to the server 1021, which then computes a difference between the received characteristic quantity and a characteristic quantity (or organism information) associated with the account number. If the computed difference is smaller than a predetermined threshold value, the organism information received at the step S243 is determined to match the organism information associated with the account number to a high degree. Then, the result of determination is used at the step S244 in the determination of matching the organism information associated with the account number with the organism information received at the step S243.

If the determination result produced at the step S244 reveals that the organism information received at the step S243 matches the organism information associated with the account number, the flow of the processing goes on to a step S245 at which the control section 1044 turns on a true-person successful verification flag in order to indicate that the user 1002 has been verified to be the true person.

If the determination result produced at the step S242 reveals that the personal identification number received at the step S241 does not match the personal identification number associated with the account number or if the determination result produced at the step S244 reveals that the organism information received at the step S243 does not match the organism information associated with the account number, on the other hand, the flow of the processing goes on to a step S246 at which the control section 1044 turns off the true-person successful verification flag in order to indicate that the user 1002 is not the true person.

The processing to verify that the user 1002 is the true person has been described above. Since the personal identification number and the organism information, which are required in the processing to verify that the user 1002 is the true person, are not stored in the portable device 1003, there is no fear that the personal identification number and the organism information are mistakenly leaked to another person or stolen by another person. As a result, it is possible to carry out the processing to verify that the user 1002 is the true person with a high degree of reliability.

As described above, the organism information is information required in the processing to verify that the user 1002 is the true person. Even if the organism information is mistakenly leaked to another person or copied by another person, a result of the processing to verify that the user 1002 is the true person will reject the requested transaction unless the person making a request for the transaction has a biological characteristic matching the organism information associated with the account, that is, unless the person making a request for the transaction has a biological characteristic matching the biological characteristic of the user 1002. Thus, even if the organism information is stolen, there is conceivably no fear that the stolen organism information is used in an illegal transaction. Thus, if it is difficult to transmit input organism information from the ATM 1001 to the server 1021 due restrictions on communications between the ATM 1001 and the server 1021, the organism information associated with an account number can be stored in the portable device 1003.

In this example, the processing to verify that the user 1002 is the true person is carried out on the basis of both a personal identification number and organism information. However, the processing to verify that the user 1002 is the true person can also be carried out on the basis of a personal identification number only or organism information only.

Refer back to the flowchart shown in FIG. 18. After the process of the step S203 is completed, the flow of the processing goes on to a step S204 at which the control section 1044 determines whether or not the result of the true-person verification process at the step S203 is OK. The process of the step S204 is carried out on the basis of the true-person successful verification flag cited above.

If the determination result produced at the step S204 indicates that the result of the true-person verification process at the step S203 is OK, the flow of the processing goes on to a step S205 at which the control section 1044 accepts the request for a transaction. In this case, a message is displayed on the display section 1081 to prompt the user 1002 to enter a transaction input. In response to the message, the user 1002 operates the buttons 1083 in order to enter information such as the type of a transaction, such as depositing, a withdrawal and a payment and the amount of money involved in the transaction.

Then, at the step S206, the control section 1044 determines whether or not the communication with the portable device 1003 is still going on. At this step, at a request made by the control section 1044, the device communication section 1043 informs the control section 1044 of whether or not the ATM 1001 is still in a state of being capable of communicating with the portable device 1003, that is, whether or not the communication with the portable device 1003 is still going on. Typically, the device communication section 1043 adopts a periodical polling technique to determine whether or not the portable device 1003 responds to a polling signal from the device communication section 1043 within a predetermined period of time in order to determine whether or not the communication with the portable device 1003 is still going on.

If the determination result produced at the step S206 reveals that the communication with the portable device 1003 is still going on, the flow of the processing goes on to a step S207 at which the ATM 1001 carries out a transaction, the request for which was accepted at the step S205. Thus, for example, the amount of money specified by the user 1002 is withdrawn from the saving account or paid to a recipient.

For example, a signal electrode is embedded below each of the buttons 1083. In this case, every time a button 1083 is pressed, a communication with the portable device 1003 is carried out and it is thus possible to determine whether or not the communication can be carried out. If the result of the verification of the communication is a successful result, data entered by pressing the buttons 1083 is regarded as valid data. That is to say, each time a button 1083 is pressed at the step S205, a predetermined communication with the portable device 1003 is carried out to determine that the communication is successfully going on. Only after the buttons 1083 are pressed a predetermined number of times and the successes of the accompanying communications are verified, the process of the step S207 is carried out. As an alternative, only after the buttons 1083 are pressed to complete an operation to enter an input as evidenced by, for example, an operation to press the $ or ENTER button and the successes of the accompanying communications are verified, the process of the step S207 is carried out.

If the determination result produced at the step S204 indicates that the result of the true-person verification process carried out at the step S203 is not OK, that is, if the true-person verification process ends in a failure, or if the determination result at the step S206 reveals that the communication with the portable device 1003 is no longer going on, on the other hand, the flow of the processing goes on to a step S208 at which an error handing process is carried out. That is to say, if the user 1002 is not verified to be the true person or a communication with the portable device 1003 carried by the user 1002 cannot be carried out, the requested transaction is not performed.

A transaction is thus performed in accordance with a procedure described above. As described above, a transaction is performed after the user 1002 is verified to be the true person and a communication with the portable device 1003 is confirmed to be going on. Thus, once the user 1002 leaves the ATM 1001 after the user 1002 is verified to be the true person by an organism authentication, for example, another person cannot pretend to be the true person to perform a transaction. In this way, the true person can be confirmed with a higher degree of reliability. In addition, since operations are verified to be operations performed by the true person, it is no longer necessary to require that a transaction be performed during a period between insertion of a card into an ATM and removal of the card from the ATM. Thus, the user does not need to carry and manage cards. As a result, user convenience is improved.

Figure 20:
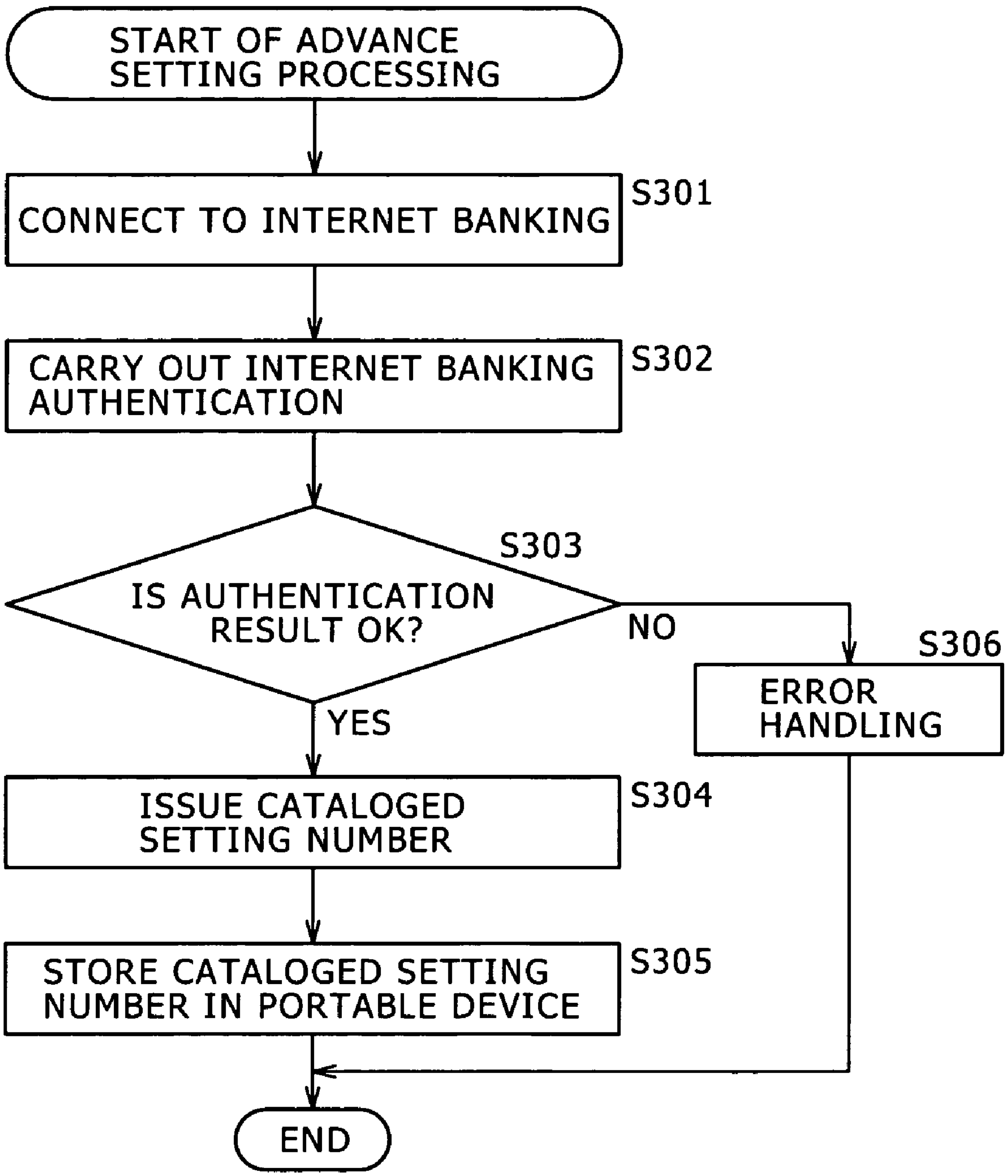
FIG. 20 shows a flowchart referred to in explanation of typical advance setting processing.

Next, the advance setting processing mentioned earlier is explained by referring to a flowchart shown in FIG. 20. The advance setting processing is carried out for example to set a permission of a transaction performed by using the ATM 1001 as a transaction involving an amount of money exceeding a transaction upper limit. The advance setting processing is carried out by using the personal computer 1006 as an access made by the user 1002 to the server 1021 through a network such as the Internet 1005.

The flowchart shown in the figure begins with a step S301, at which the user 1002 operates the personal computer 1006 to carry out an Internet banking transaction. At that time, for example, the user 1002 enters a predetermined command, an account number and other information to the personal computer 1006 to be transmitted to the server 1021. Then, the server 1021 transmits predetermined information described in an HTML (hyper text markup language) to the personal computer 1006 to be displayed on a display section of the personal computer 1006 as an Internet banking screen.

Subsequently, at the step S302, the server 1021 carries out an Internet banking authentication process. Let us assume for example that the Internet banking authentication method presented at the step S106 of the flowchart shown in FIG. 15 is an authentication method using a password. In this case, at the step S302, a password entered by the user 1002 in accordance with an instruction display on the screen of the personal computer 1006 is transmitted to the server 1021 to be compared with Internet banking information included in the account information for the user 1002 in order to determine whether or not the password matches a password included in the Internet banking information.

Then, at the step S303, the server 1021 determines whether or not the result of the verification carried out at the step S302 is OK. The result of the verification at the step S302 is determined to be OK if the password entered by the user 1002 matches the password of the Internet banking information included in the account information for the user 1002.

If the determination result produced at the step S303 indicates that the result of the verification at the step S302 is OK, the flow of the processing goes on to a step S304 at which the server 1021 issues a cataloged setting number and transmits the cataloged setting number to the personal computer 1006. The cataloged setting number is a number issued in the advance setting processing. A transaction, such as a withdrawal or payment, exceeding a predetermined upper limit is normally prohibited unless the cataloged setting number is entered by the user 1002. The cataloged setting number is recorded in the account information shown in FIG. 16.

Then, at the step S305, the personal computer 1006 transmits the cataloged setting number issued at the step S304 to the portable device 1003 through a predetermined interface to be stored in a storage section employed in the portable device 1003. As a result, the cataloged setting number is recorded in information stored in the storage section of the portable device 1003 as shown in FIG. 17.

It is to be noted that the cataloged setting number can also be entered to the portable device 1003 by operating an operation section employed in the portable device 1003 and stored in the portable device 1003. In addition, a validity period is provided for the cataloged setting number. In this case, when the validity period expires, the cataloged setting number is deleted from the information shown in FIG. 16, and information such as a numerical value corresponding to the validity period is recorded in the area of the validity period. In this case, the validity period is provided for the cataloged setting number in FIG. 17. When the validity period expires, the server 1021 deletes the cataloged setting number from the account information shown in FIG. 16, and information such as a numerical value corresponding to the validity period is recorded in the area of the validity period.

The advance setting processing is carried out as described above. Since a cataloged setting number issued in an advance setting processing is stored in the portable device 1003, the user 1002 does not need to memorize the number or record the number onto a piece of paper. Thus, a transaction can be performed with ease and a high degree of safety.

Figure 21:
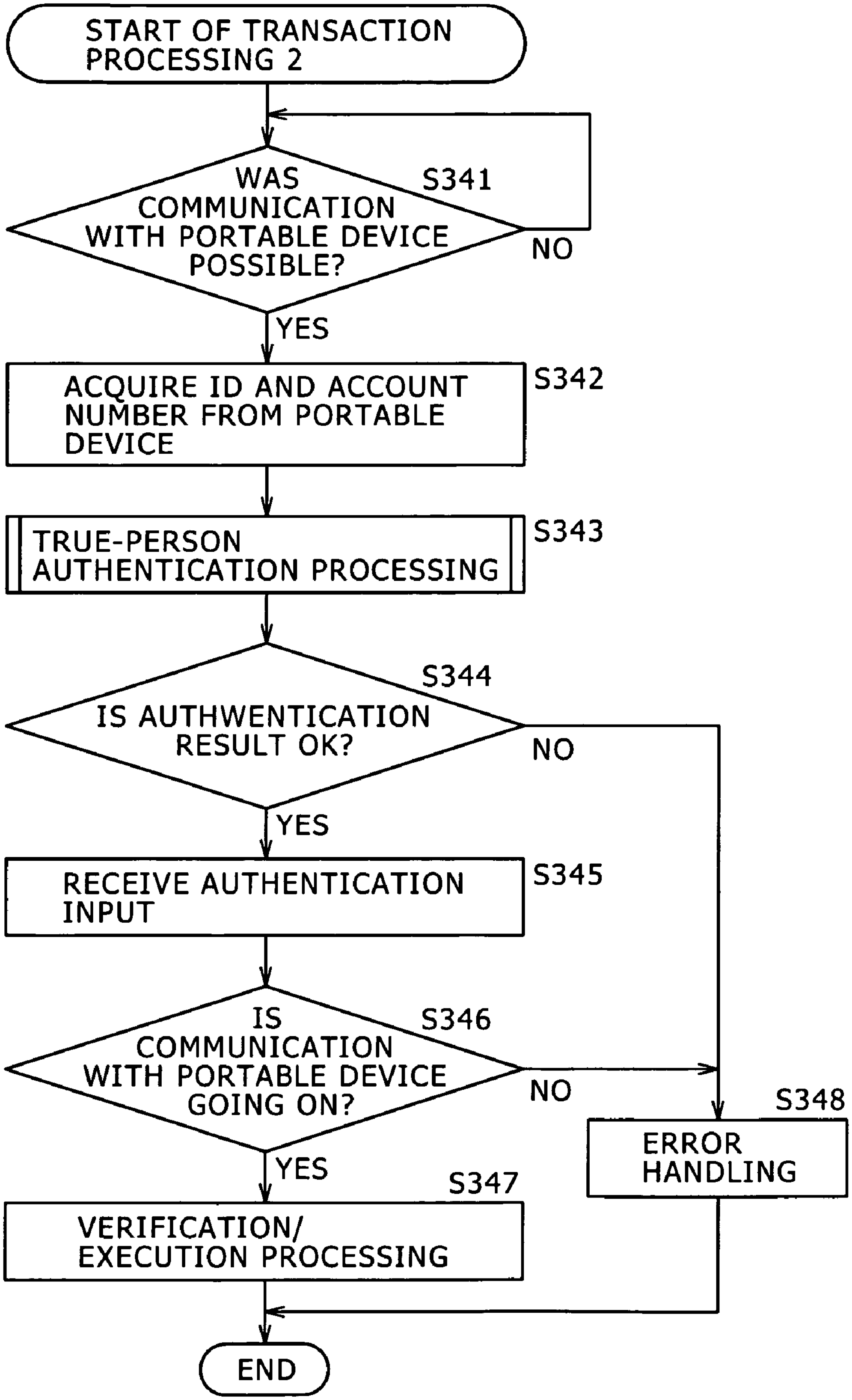
FIG. 21 shows a flowchart referred to in explanation of typical transaction processing 2.

By referring to a flowchart shown in FIG. 21, the following description explains transaction processing 2 carried out to perform a transaction for an account for which an advance setting processing has been carried out.

Processes at steps S341 to S346 and S348 of the flowchart shown in FIG. 21 are identical with the processes carried out at steps S201 to S206 and S208 of the flowchart shown in FIG. 18. Accordingly, the processes described above are not explained in detail.

If the determination result produced at the step S346 reveals that a communication with the portable device 1003 is going on, the flow of the processing goes on to a step S347 at which the ATM 1001 carries out verification/execution processing in accordance with the transaction input received at the step S345. The verification/execution processing is carried out to verify an advance setting processing and to execute the desired transaction.

Figure 22:
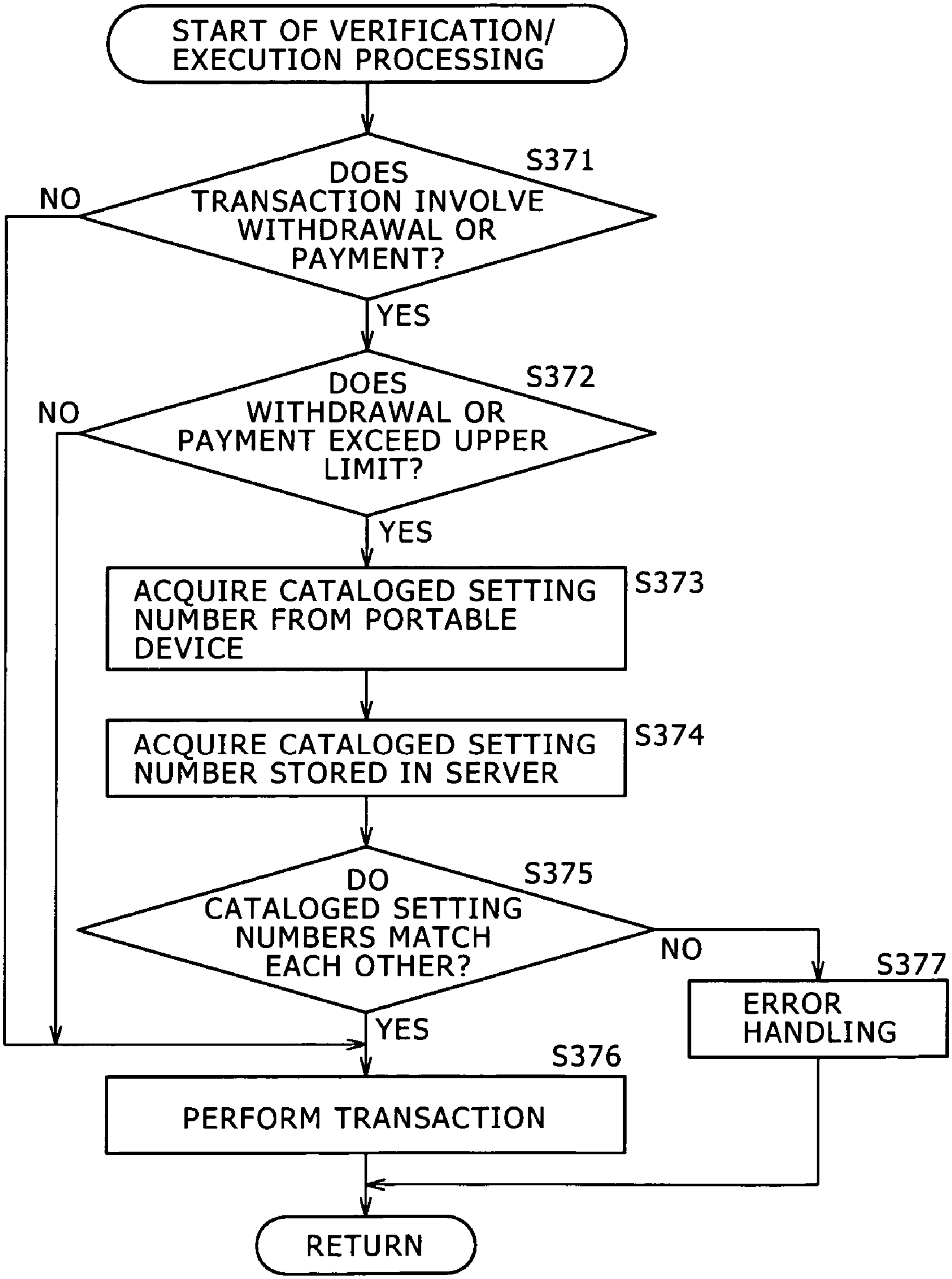
FIG. 22 shows a flowchart referred to in explanation of typical verification/execution processing.

By referring to a flowchart shown in FIG. 22, the following description explains details of the verification/execution processing carried out at the step S347 of the flowchart shown in FIG. 21.

At the step S371, the control section 1044 determines whether or not the transaction at the step S345 is a withdrawal or a payment from a saving account. If the determination result produced at the step S371 indicates that the transaction at the step S345 is a withdrawal or a payment, the flow of the processing goes on to a step S372.

At the step S372, the control section 1044 determines whether or not the amount of money involved in the withdrawal or payment of the transaction received at the step S345 exceeds a threshold set in advance.

Typically, the threshold representing the upper limit of the amount of money involved in the withdrawal or payment of a one-time transaction is stored in a ROM in the control section 1044. Thus, the amount of money involved in the withdrawal or payment of the transaction is compared with the upper limit stored in the ROM. As an alternative, the ATM 1001 makes an access to the server 1021 to acquire a transaction history of account information for the account. Then, the ATM 1001 computes a total amount of money withdrawn or paid from the saving account in transactions carried out on 1 day (or on that day). Then, the total amount is added to the amount of money involved in the transaction received at the step S345 to provide a sum to be compared with a threshold stored typically in the ROM of the control section 1044 as an upper limit of the sum of money that can be spent in transactions carried out on 1 day.

If the determination result at the step S372 reveals that a withdrawal or payment is greater than the threshold, the flow of the processing goes on to a step S373 at which the control section 1044 controls the device communication section 1043 to acquire the cataloged setting number stored in the storage section shown in FIG. 17 as the storage section employed in the portable device 1003. In order to acquire the cataloged setting number, the device communication section 1043 transmits a request to the portable device 1003 as a request for transmission of the cataloged setting number. At the request, the portable device 1003 transmits the cataloged setting number stored in the storage section in the portable device 1003 to the device communication section 1043.

Then, at the step S374, the control section 1044 transmits the account number received in a process carried out at the step S342 to the server 1021 by way of the communication section 1045 and requests the server 1021 to search the account information associated with the account number as shown in FIG. 16 for the cataloged setting number. The server 1021 then transmits the cataloged setting number to the ATM 1001.

Then, at the step S375, the control section 1044 determines whether or not the cataloged setting number acquired from the portable device 1003 in a process at the step S373 matches the cataloged setting number acquired in a process at the step S374. If the result of the determination shows that the cataloged setting numbers match each other, the flow of the processing goes on to a step S376. If the result of the determination shows that the cataloged setting numbers do not match each other, on the other hand, the flow of the processing goes on to a step S377.

It is to be noted that the server 1021 is also capable of determining whether or not the cataloged setting number acquired from the portable device 1003 at the step S373 matches the cataloged setting number acquired from the account information of the server 1021 at the step S374 and then transmitting the result to the ATM 1001.

That is to say, if the cataloged setting number acquired from the portable device 1003 in a process carried out at the step S373 matches the cataloged setting number acquired from the account information of the server 1021 in a process carried out at the step S374, the requested withdrawal or payment transaction is considered to be a transaction requested by the true person having a contracted account for which the advance setting processing explained earlier by referring to the flowchart shown in FIG. 20 has been carried out in advance in accordance with a will of the user 1002 serving as the true person having a contracted account. In this case, the transaction received at the step S345 is carried out in a process performed at the step S376.

If the cataloged setting number acquired from the portable device 1003 in a process carried out at the step S373 does not match the cataloged setting number acquired from the account information of the server 1021 in a process carried out at the step S374, on the other hand, the advance setting processing for the account is considered to have been carried out not in accordance with a will of the true person having a contracted account. In this case, an error handling process is carried out at the step S377. That is to say, the execution of the verification processing is ended without performing the transaction received at the step S345.

The verification/execution processing is carried out as described above. By carrying out the verification/execution processing as described above, a person making a request for execution of a transaction can be verified to be the true person with a higher degree of reliability and the financial transaction can hence be performed with a higher degree of safety.

By referring to a flowchart shown in FIG. 23, the following description explains processing carried out by the portable device 1003 to accompany the processing described earlier by referring to a flowchart shown in FIG. 18, 21 or 22. It is to be noted that a communication to exchange signals between the ATM 1001 and the portable device 1003 in the processing represented by the flowchart shown in FIG. 23 is carried out by using the body of the user 1002 as a communication medium as described earlier.

At the step S401, the control section 1103 in the portable device 1003 determines whether or not a request for transmission of information stored in the portable device 1003 has been received from the ATM 1001. If the result of determination reveals that a request for transmission of information stored in the portable device 1003 has not been received from the ATM 1001, the flow of the processing goes back to the same step to repeat the process of the step in a state of waiting for such a request to be received from the ATM 1001. The request for transmission of information stored in the portable device 1003 is made by the ATM 1001 for example in the process at the step S202 of the flowchart shown in FIG. 18 or the process at the step S373 of the flowchart shown in FIG. 22. It is to be noted that, prior to the determination process of the step S401, the sender of the request is examined in an authentication process to determine whether or not the sender of the request is indeed the ATM 1001. After the ATM 1001 is authenticated, then the determination process of the step S401 is carried out in order to determine whether or not a request for transmission of information stored in the portable device 1003 has been received from the ATM 1001.

If the determination result produced at the step S401 reveals that a request for transmission of information stored in the portable device 1003 has been received from the ATM 1001, the flow of the processing goes on to a step S402 at which the control section 1103 transmits information stored in the storage section in the portable device 1003 to the ATM 1001 in accordance with the request made by the ATM 1001 as a request for transmission of the information. The information includes the device ID, an account number and a cataloged setting number.

The portable device 1003 carries out the processing as described above. The user 1002 merely needs to attach the portable device 1003 to its body in order for the portable device 1003 to carry out a communication with the ATM 1001. Thus, the user 1002 is not forced to carry out complicated operations but is yet capable of enjoying a rendered safe financial transaction service without making a special contract in advance.

It is to be noted that the series of processes described previously can be carried out by hardware and/or execution of software. If the series of processes described above is carried out by execution of software, programs composing the software can be installed into a computer embedded in dedicated hardware, a general-purpose personal computer or the like from typically a network or a recording medium. By installing a variety of programs into the general-purpose personal computer, the personal computer is capable of carrying out a variety of functions.

In order to carry out the series of processes described above by software, the network from which the programs composing the software are installed can be the Internet. On the other hand, the recording medium from which the programs composing the software are installed is typically a removable recording medium.

It is to be noted that the removable recording medium is provided to the user as a medium used for distributing the programs to the user. Examples of the removable recording mediums include a magnetic disk such as a floppy disk (a trade mark), an optical disk such as a CD-ROM (Compact Disk-Read Only Memory) or a DVD (Digital Versatile Disk), a magneto-optical disk such as an MD (Mini-Disk, which is a trademark) as well as a semiconductor memory. Instead of installing the programs from the removable recording mediums, the programs can also be stored in advance in an embedded recording medium included in the main units of the transmission and reception apparatus. Examples of the embedded recording medium are a hard disk included in the storage section and the ROM.

It is also worth noting that, in this specification, steps of the flowchart described above can be carried out not only in a pre-prescribed order along the time axis, but also concurrently or individually.

In addition, it should be understood by those skilled in the art that a variety of modifications, combinations, sub-combinations and alterations may occur in dependence on design requirements and other factors insofar as they are within the scope of the appended claims or the equivalents thereof.

What is claimed is:

1. An information processing system comprising a terminal to be operated by a user and an information processing apparatus communicating with said terminal wherein:

said information processing apparatus includes:

a first signal electrode for receiving and transmitting a signal through a communication medium in a communication with said terminal;

a first reference electrode for establishing a reference point used for determining the value of said signal transmitted to or received from said terminal;

a first determination section for determining whether or not a communication with said terminal is possible;

an information acquisition section for sending a request to said terminal as a request for transmission of information stored in said terminal in order to acquire said information if a determination result produced by said first determination section reveals that a communication with said terminal is possible;

an operation-input reception section for receiving an operation input entered by said user;

a second determination section for determining whether or not a communication with said terminal is going on; and a process execution section for carrying out a process on said operation input received by said operation-input reception section on the basis of said information acquired by said information acquisition section if a determination result produced by said second determination section indicates that a communication with said terminal is going on, and said terminal comprises:

a second signal electrode for receiving and transmitting a signal transmitted through a communication medium in a communication with said information processing apparatus;

a second reference electrode for establishing a reference point used for determining the value of said signal transmitted to or received from said information processing apparatus;

a request determination section for determining whether or not a request has been received from said information processing apparatus as a request for transmission of information stored in said terminal; and a stored-information transmission section for transmitting said information stored in said terminal to said information processing apparatus as a signal if a determination result produced by said request determination section indicates that a request for transmission of information stored in said terminal has been received from said information processing apparatus, wherein said first reference electrode and said second reference electrode are provided without forming a closed circuit with each other.

2. An information processing apparatus for communicating with a terminal carried by a user, said information processing apparatus comprising:

a signal electrode for receiving and transmitting a signal transmitted through a communication medium in a communication with said terminal;

a reference electrode for establishing a reference point used for determining the value of said signal transmitted to or received from said terminal;

a first determination section for determining whether or not a communication with said terminal is possible;

an information acquisition section for sending a request to said terminal as a request for transmission of information stored in said terminal in order to acquire said information if a determination result produced by said first determination section reveals that a communication with said terminal is possible;

an operation-input reception section for receiving an operation input entered by said user;

a second determination section for determining whether or not a communication with said terminal is going on; and a process execution section for carrying out a process on said operation input received by said operation-input reception section on the basis of said information acquired by said information acquisition section if a determination result produced by said second determination section indicates that a communication with said terminal is going on, wherein said reference electrode is provided without forming a closed circuit with said terminal.

3. The information processing apparatus according to claim 2 wherein:

said signal electrode is provided as an electrode having a stronger electrostatic coupling with said communication medium than an electrostatic coupling between said reference electrode and said communication medium; and a signal corresponding to an electric-potential difference generated between said signal electrode and said reference electrode as a difference in electric potential between said signal electrode and said reference electrode is transmitted to said terminal or received from said terminal.

4. The information processing apparatus according to claim 3 wherein:

said communication medium is a human body; and when said user touches said signal electrode, said first determination section determines that a communication with said terminal is possible or said second determination section determines that a communication with said terminal is going on.

5. The information processing apparatus according to claim 2, said information processing apparatus further having a true-person verification section for verifying that said user is the true person on the basis of information acquired by said information acquisition section from said terminal.

6. The information processing apparatus according to claim 5 wherein said true-person verification section verifies that said user is the true person on the basis of a result of determination as to whether or not a personal identification number entered by said user matches a personal identification number cataloged in advance.

7. The information processing apparatus according to claim 5, said information processing apparatus further having an organism-information input reception section for receiving input organism information of said user, wherein said true-person verification section verifies that said user is the true person on the basis of a degree to which a characteristic quantity of said input organism information received by said organism-information input reception section matches a characteristic quantity of input organism information cataloged in advance.

8. The information processing apparatus according to claim 2, said information processing apparatus further having a third determination section for determining whether or not a process can be carried out on an operation input received by said operation-input reception section on the basis of information stored in said terminal as information on executability of said process if a determination result produced by said second determination section reveals that a communication between said information processing apparatus and said terminal is going on.

9. The information processing apparatus according to claim 8 wherein, if said process to be carried out on an operation input received by said operation-input reception section satisfies a condition set in advance, said third determination section acquires information from said terminal as said information on executability of said process, determining whether or not said acquired information matches information cataloged in advance and, if said result of determination indicates that said acquired information matches said information cataloged in advance, determines that said process can be carried out on said operation input received by said operation-input reception section.

10. The information processing apparatus according to claim 9 wherein information stored in said terminal as said information on executability of said process is information received by said terminal from another information processing apparatus.

11. An information processing method adopted by an information processing apparatus, which includes a signal electrode for receiving and transmitting a signal transmitted through a communication medium in a communication with a terminal carried by a user as well as a reference electrode for establishing a reference point used for determining the value of said signal transmitted to or received from said terminal and is used for communicating with said terminal on the basis of said signals transmitted to said terminal and received from said terminal by said signal electrode, said reference electrode being provided without forming a closed circuit with said terminal, said information processing method comprising:

a first determination step of determining whether or not a communication with said terminal is possible;

an information acquisition step of sending a request to said terminal as a request for transmission of information stored in said terminal in order to acquire said information if a determination result produced in a process carried out at said first determination step reveals that a communication with said terminal is possible;

an operation-input reception step of receiving an operation input entered by said user;

a second determination step of determining whether or not a communication with said terminal is going on; and a process execution step of carrying out a process on said operation input received in a process carried out at said operation-input reception step on the basis of said information acquired in a process carried out at said information acquisition step if a determination result produced in a process carried out at said second determination step indicates that a communication with said terminal is going on.

12. A computer program tangibly embodied in a computer-readable recording medium to drive an information processing apparatus, said information processing apparatus including a signal electrode for receiving and transmitting a signal transmitted through a communication medium in a communication with a terminal carried by a user and a reference electrode for establishing a reference point used for determining a top-bottom difference of said signal on the basis of said signals transmitted to said terminal and received from said terminal by said signal electrode, said reference electrode being provided without forming a closed circuit with said terminal, said program carrying out:

a first determination control step of controlling a result of determination as to whether or not a communication with said terminal is possible;

an information acquisition control step of sending a request to said terminal as a request for transmission of information stored in said terminal in order to acquire said information if a determination result produced in a process carried out at said first determination control step reveals that a communication with said terminal is possible;

an operation-input reception control step of receiving an operation input entered by said user;

a second determination control step of controlling a result of determination as to whether or not a communication with said terminal is going on; and a process execution control step of controlling processing carried out on said operation input received in a process carried out at said operation-input reception control step on the basis of said information acquired in a process carried out at said information acquisition control step if a determination result produced in a process carried out at said second determination control step indicates that a communication with said terminal is going on.

13. A recording medium used for recording a program to be executed by a computer to drive an information processing apparatus, said information processing apparatus including a signal electrode for receiving and transmitting a signal transmitted through a communication medium in a communication with a terminal carried by a user and a reference electrode for establishing a reference point used for determining a top-bottom difference of said signal on the basis of said signals transmitted to said terminal and received from said terminal by said signal electrode, said reference electrode being provided without forming a closed circuit with said terminal, said program carrying out:

a first determination control step of controlling a result of determination as to whether or not a communication with said terminal is possible;

an information acquisition control step of sending a request to said terminal as a request for transmission of information stored in said terminal in order to acquire said information if a determination result produced in a process carried out at said first determination control step reveals that a communication with said terminal is possible;

an operation-input reception control step of receiving an operation input entered by said user;

a second determination control step of controlling a result of determination as to whether or not a communication with said terminal is going on; and a process execution control step of controlling processing carried out on said operation input received in a process carried out at said operation-input reception control step on the basis of said information acquired in a process carried out at said information acquisition control step if a determination result produced in a process carried out at said second determination control step indicates that a communication with said terminal is going on.

14. An information processing device carried by a user as a device for communicating with another information processing apparatus, said information processing device comprising:

a signal electrode for receiving and transmitting a signal transmitted through a communication medium in a communication with said other information processing apparatus;

a reference electrode for establishing a reference point used for determining the value of said signal transmitted to or received from said other information processing apparatus;

a request determination section for determining whether or not a request has been received from said other information processing apparatus as a request for transmission of information stored in said information processing device; and a stored-information transmission section for transmitting said information stored in said information processing device to said other information processing apparatus as a signal if a determination result produced by said request determination section indicates that a request for transmission of information stored in said information processing device has been received from said other information processing apparatus, wherein said reference electrode is provided without forming a closed circuit with said information processing apparatus.

15. The information processing device according to claim 14 wherein:

said signal electrode is provided as an electrode having a stronger electrostatic coupling with said communication medium than an electrostatic coupling between said reference electrode and said communication medium; and a signal corresponding to an electric-potential difference generated between said signal electrode and said reference electrode as a difference in electric potential between said signal electrode and said reference electrode is transmitted to said other information processing apparatus or received from said other information processing apparatus.

16. An information processing method adopted in an information processing device, which is carried by a user as a device for communicating with another information processing apparatus, includes a signal electrode for receiving and transmitting a signal transmitted through a communication medium in a communication with said other information processing apparatus and a reference electrode for establishing a reference point used for determining the value of said signal transmitted to or received from said other information processing apparatus, said reference electrode being provided without forming a closed circuit with said other information processing apparatus, said information processing method comprising:

a request determination step of determining whether or not a request has been received from said other information processing apparatus as a request for transmission of information stored in said information processing device; and a stored-information transmission step of transmitting said information stored in said information processing device to said other information processing apparatus as a signal if a determination result produced in a process carried out at said request determination step indicates that a request for transmission of information stored in said information processing device has been received from said other information processing apparatus.

* * * * *